United States Patent
Asakawa

(10) Patent No.: US 12,497,533 B2
(45) Date of Patent: Dec. 16, 2025

(54) TREATMENT LIQUID, RECORDING METHOD, AND INK SET

(71) Applicant: SEIKO EPSON CORPORATION, Tokyo (JP)

(72) Inventor: Yuta Asakawa, Azumino (JP)

(73) Assignee: SEIKO EPSON CORPORATION (JP)

( * ) Notice: Subject to any disclaimer, the term of this patent is extended or adjusted under 35 U.S.C. 154(b) by 243 days.

(21) Appl. No.: 18/451,186

(22) Filed: Aug. 17, 2023

(65) Prior Publication Data

US 2024/0059923 A1  Feb. 22, 2024

(30) Foreign Application Priority Data

Aug. 18, 2022 (JP) ................. 2022-130697

(51) Int. Cl.
  *C09D 11/54* (2014.01)
  *B41J 2/045* (2006.01)
  *C09D 11/30* (2014.01)

(52) U.S. Cl.
  CPC ............. *C09D 11/54* (2013.01); *B41J 2/045* (2013.01); *C09D 11/30* (2013.01)

(58) Field of Classification Search
  CPC ....... C09D 11/322; C09D 11/38; C09D 11/54; C09D 11/40; C09D 11/30; C09D 11/033; B41M 5/0017; B41M 5/0011; B41M 5/0023; B41M 5/0064; B41M 5/0047; D06P 5/30; B41J 11/002
  See application file for complete search history.

(56) References Cited

U.S. PATENT DOCUMENTS

| | | | | |
|---|---|---|---|---|
| 5,510,415 | A * | 4/1996 | Zahrobsky | D06P 1/5292 347/100 |
| 7,367,666 | B2 * | 5/2008 | Doi | B41J 3/60 347/100 |
| 8,590,999 | B2 * | 11/2013 | Irita | C09D 11/322 347/95 |
| 2010/0214352 | A1 * | 8/2010 | Tsunoda | D06P 5/30 524/386 |
| 2012/0306976 | A1 * | 12/2012 | Kitagawa | D06P 5/30 347/100 |
| 2015/0328904 | A1 | 11/2015 | Yano | |
| 2017/0355868 | A1 * | 12/2017 | Saiga | C09D 11/40 |
| 2018/0058002 | A1 * | 3/2018 | Ohashi | B41J 3/4078 |
| 2021/0071026 | A1 * | 3/2021 | Toeda | C09D 11/322 |
| 2021/0170779 | A1 * | 6/2021 | Asakawa | C09D 11/033 |

FOREIGN PATENT DOCUMENTS

JP  2015-217591 A  12/2015

* cited by examiner

*Primary Examiner* — John P Zimmermann
(74) *Attorney, Agent, or Firm* — Harness, Dickey & Pierce, P.L.C.

(57) ABSTRACT

A water-based treatment liquid is used for recording together with an ink jet ink which is a water-based ink composition, and the treatment liquid contains: a polyvalent metal salt; a resin selected from an acrylic-based resin and a maleic acid-based resin; and a compound selected from an organic acid and an organic amine. In the treatment liquid described above, a content of the resin with respect to a total mass of the treatment liquid is 1 percent by mass or less, and the treatment liquid has a pH of 5.5 to 7.5.

16 Claims, 2 Drawing Sheets

TREATMENT LIQUID, RECORDING METHOD, AND INK SET

The present application is based on, and claims priority from JP Application Serial Number 2022-130697, filed Aug. 18, 2022, the disclosure of which is hereby incorporated by reference herein in its entirety.

BACKGROUND

1. Technical Field

The present disclosure relates to a treatment liquid, a recording method, and an ink set.

2. Related Art

There has been known a recording method to suppress bleeding irregularity in a manner such that by the use of a reaction liquid (treatment liquid) containing an aggregating agent which aggregates at least one ink component, an ink adhered to a recording medium is rapidly fixed (fluidity of the ink is decreased). For example, JP-A-2015-217591 has proposed an ink jet recording method using a reaction liquid which contains a reactant, such as a carboxylic acid or a salt thereof, to react with at least one component of an ink jet ink.

However, in the case in which an excellent image quality is obtained using a treatment liquid, when the treatment liquid is stored or is introduced in an ink jet recording apparatus, foreign materials are unfavorably generated in the treatment liquid in some cases. When the foreign materials as described above are generated, a storage stability of the treatment liquid may be concerned, and in addition, an ejection failure of an ink jet head to eject the treatment liquid may arise in some cases.

SUMMARY

According to an aspect of the present disclosure, there is provided a water-based treatment liquid used for recording together with an ink jet ink which is a water-based ink composition, and the treatment liquid comprises: a polyvalent metal salt; a resin selected from an acrylic-based resin and a maleic acid-based resin; and a compound selected from an organic acid and an organic amine. In the treatment liquid described above, a content of the resin with respect to a total mass of the treatment liquid is 1 percent by mass or less, and the treatment liquid has a pH of 5.5 to 7.5.

According to another aspect of the present disclosure, there is provided a recording method which uses the treatment liquid and the ink jet ink described above, and the recording method comprises: a treatment liquid adhesion step of adhering the treatment liquid to a recording medium; and an ink adhesion step of ejecting the ink jet ink from an ink jet head so as to be adhered to the recording medium.

According to another aspect of the present disclosure, there is provided an ink set comprising the treatment liquid and the ink jet ink described above.

DESCRIPTION OF EMBODIMENTS

Figure 1:
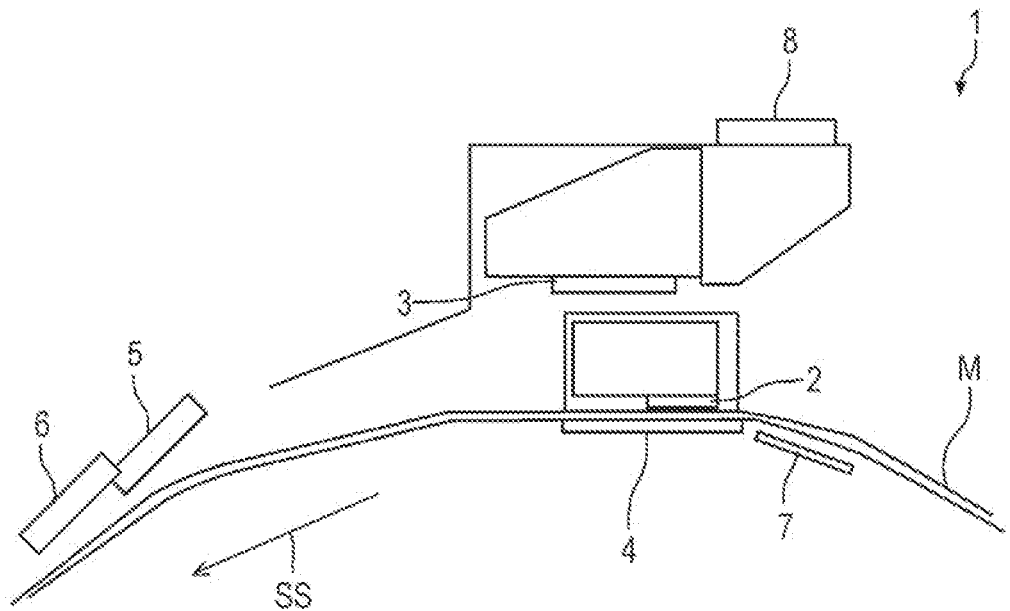
FIG. 1 is a schematic view of one example of an ink jet recording apparatus.

Hereinafter, embodiments of the present disclosure will be described. The following embodiments are described to explain examples of the present disclosure. The present disclosure is not limited at all to the following embodiments and also includes various types of modified embodiments to be performed without departing from the scope of the present disclosure. In addition, the following constituents described below are not always required to be essential constituents of the present disclosure.

1. Treatment Liquid

A treatment liquid according to this embodiment is a treatment liquid used for recording together with an ink jet ink. The ink jet ink used for the recording together with the treatment liquid is a water-based ink composition. In addition, the treatment liquid according to this embodiment is a water-based treatment liquid and contains a polyvalent metal salt, a resin selected from an acrylic-based resin and a maleic acid-based resin, and a compound selected from an organic acid and an organic amine. In addition, a content of the resin with respect to a total mass of the treatment liquid is 1 percent by mass or less, and the treatment liquid has a pH of 5.5 to 7.5.

1.1. Polyvalent Metal Salt

The treatment liquid contains a polyvalent metal salt. As the polyvalent metal salt, there may be mentioned a water-soluble compound formed from an at least divalent polyvalent metal ion and an anionic ion to be bound thereto. As a concrete example of the polyvalent metal ion, for example, there may be mentioned a divalent metal ion, such as $Ca^{2+}$, $Cu^{2+}$, $Ni^{2+}$, $Mg^{2+}$, $Zn^{2+}$, or $Ba^{2+}$, or a trivalent metal ion, such as $Al^{3+}$, $Fe^{3+}$, or $Cr^{3+}$. As the anionic ion, for example, there may be mentioned $Cl^{-1}$, $I^{-1}$, $Br^{-1}$, $SO_4^{2-}$, $ClO^{3-}$, or $NO^{3-}$, or $HCOO^-$ or $CH_3COO^-$. Among those polyvalent metal salts, in view of stability of the treatment liquid and reactivity as an aggregating agent, a calcium salt or a magnesium salt is preferable.

In more particular, for example, there may be mentioned a magnesium salt, such as magnesium chloride, magnesium bromide, magnesium acetate, magnesium formate, magnesium lactate, magnesium nitrate, magnesium sulfate, or magnesium thiosulfate; a calcium salt, such as calcium formate, calcium lactate, calcium hydrogencarbonate, calcium acetate, calcium propionate, calcium benzoate, calcium dihydrogenphosphate, calcium nitrate, or calcium chloride; or aluminum salt, such as aluminum nitrate, aluminum chloride, aluminum sulfate, aluminum ammonium sulfate, aluminum potassium sulfate, aluminum formate, aluminum acetate, or aluminum lactate. The polyvalent metal salt may be used alone, or at least two types thereof may be used in combination. In addition, an anhydride and/or a hydrate thereof may also be used.

When the polyvalent metal salt is a calcium salt, since an aggregation ability of the components contained in the ink is preferable, a more excellent image quality is preferably obtained. In addition, the polyvalent metal salt is preferably an organic acid polyvalent metal salt in terms of low deliquescence, and in particular, since a calcium salt of an organic acid has a low deliquescence, a water resistance and a moisture abrasion resistance of a recorded matter to be obtained can be preferably made more excellent. On the other hand, when the polyvalent metal salt is a calcium salt, foreign materials are particularly liable to be generated in the treatment liquid; however, in the treatment liquid according to this embodiment, since the resin selected from an acrylic-based resin and a maleic acid-based resin which will be described below is contained, even when the polyvalent metal salt is a calcium salt, the generation of foreign materials is suppressed.

A content of the polyvalent metal salt in the treatment liquid with respect to the total mass thereof is preferably 0.5 to 10 percent by mass, more preferably 1 to 10 percent by mass, even more preferably 1.5 to 8 percent by mass, and further preferably 2 to 7 percent by mass. When the content of the polyvalent metal salt is in the range as described above, the image quality of an image formed by the ink jet ink can be made more preferable.

1.2. Resin

The treatment liquid contains a resin selected from an acrylic-based resin and a maleic acid-based resin.

The acrylic-based resin is a resin formed by polymerization using at least one acrylic-based monomer. The acrylic-based monomer is a (meth)acrylic monomer and includes an acrylic monomer and a methacrylic monomer. A copolymer between an acrylic-based monomer and at least one of other monomers may also be used, and as the other monomers, for example, a vinyl monomer may be mentioned. In addition, a resin containing a maleic-based monomer is included in the maleic acid-based resin which will be described below.

As the acrylic-based resin, for example, there may be mentioned a styrene-acrylic acid copolymer, a styrene-acrylic acid-acrylate copolymer, a styrene-methacrylic acid copolymer, or a styrene-methacrylic acid-acrylate copolymer.

The maleic acid-based resin is a resin formed by polymerization using at least maleic acid or a maleic acid derivative. As the maleic acid derivative, for example, maleic anhydride or a maleic acid ester may be mentioned. A copolymer of maleic acid or a maleic acid derivative with at least one of other monomers may also be used. As the other monomers, for example, a vinyl monomer may be mentioned.

As the maleic acid-based resin, for example, a styrene-maleic acid copolymer, an acrylate-maleic acid copolymer, or a styrene-acrylate-maleic acid copolymer may be mentioned.

Those resins each may form a salt. In addition, in this section, even when acrylic acid or an acrylic acid ester is contained in the maleic acid-based resin as a constituent monomer thereof, the resin described above is also included in the maleic acid-based resin.

Since a partially esterified maleic acid-based resin tends to react with a metal salt, the resin as described above is preferably not selected, or the usage thereof is more preferably decreased.

A total content of the resin in the treatment liquid with respect to the total mass thereof is 1 percent by mass or less. In addition, the total content of the resin in the treatment liquid with respect to the total mass thereof is preferably 0.01 to 1 percent by mass, more preferably 0.05 to 0.9 percent by mass, even more preferably 0.05 to 0.6 percent by mass, and further preferably 0.1 to 0.6 percent by mass.

Since the total content of the resin in the treatment liquid is in the range as described above, even when a lubricant is contained in a member in contact with the treatment liquid, the generation of foreign materials in the treatment liquid can be sufficiently suppressed. The reason the effect as described above can be obtained is believed as described below. For example, precipitation of the lubricant from the member is suppressed by the resin, and dispersion of the lubricant thus precipitated is stabilized by the resin.

In addition, although the generation of foreign materials caused by aggregation of the resin is concerned, since the compound selected from an organic acid and an organic amine which will be described below is contained in the treatment liquid according to this embodiment, the compound described above functions as a pH adjuster, and the pH of the treatment liquid is controlled at 5.5 to 7.5. As a result, the aggregation of the resin and the generation of foreign materials therefrom are both suppressed, and hence, the generation of foreign materials caused by the member and the generation of foreign materials from the resin can both be suppressed.

The resin may be a resin dispersed in a water-based medium like an emulsion or a water-soluble resin. However, the resin is more preferably a water-soluble resin. When a water-soluble resin is selected, the generation of foreign materials is more likely to be suppressed.

For example, when a volume average particle diameter (D50) measurement is performed on a solution in which 1 g of a resin solid content is diluted with water 100 times using a particle size distribution meter based on a dynamic light scattering method, if a particle diameter peak is not detected, this resin is regarded as the water-soluble resin. As the particle size distribution meter based on a dynamic light scattering method, for example, Nanotrac Wave II-EX150 may be mentioned.

Furthermore, the resin is more preferably selected from resins not to react with a calcium formate aqueous solution. When the resin as described above is selected, even when the lubricant is contained in the member in contact with the treatment liquid, the generation of foreign materials can be made more unlikely to occur.

1.3. Compound Selected from Organic Acid and Organic Amine

The treatment liquid according to this embodiment contains a compound selected from an organic acid and an organic amine.

As the organic acid, for example, a carboxylic acid may be mentioned. As the carboxylic acid, for example, a monocarboxylic acid, a dicarboxylic acid, or a tricarboxylic acid may be mentioned, and a dicarboxylic acid is preferable. The organic acid may also be a hydroxy acid. The hydroxy acid is an organic acid having a hydroxy group in its molecule and may also be a monocarboxylic acid, a dicarboxylic acid, or a tricarboxylic acid.

As the organic acid, for example, there may be mentioned a monocarboxylic acid, such as formic acid, acetic acid, propionic acid, glycolic acid, pyruvic acid, pyrrolidone carboxylic acid, pyrrole carboxylic acid, furan carboxylic acid, pyridine carboxylic acid, coumaric acid, thiophene carboxylic acid, or nicotinic acid; a dicarboxylic acid, such as oxalic acid, malonic acid, succinic acid, glutaric acid, adipic acid, maleic acid, fumaric acid, or pyrone carboxylic acid; a hydroxy carboxylic acid, such as malic acid, ascorbic acid, citric acid, tartaric acid, or lactic acid; or a derivative or a salt of at least one of those mentioned above.

As the organic amine, a compound having an amino group on an alkane skeleton may be mentioned. In particular, an alkanolamine having a hydroxy group and an amino group on an alkane skeleton may be mentioned. As the organic amine, an alkanolamine is more preferable. The number of hydroxy groups of the alkanolamine in its molecule is 1 or more, preferably 1 to 5, and more preferably 2 to 3. The number of carbon atoms of the organic amine in its molecule is preferably 1 to 20, more preferably 2 to 10, and further preferably 6 to 9. The number of carbon atoms per alkane skeleton is preferably 1 to 6 and more preferably 2 to 4. The number of amino groups of the organic amine in its molecule is 1 or more, preferably 1 to 5, and more preferably 1 to 2.

Although the organic amine is not particularly limited, for example, there may be mentioned ethanolamine, N-methylethanolamine, N,N-dimethylethanolamine, N-ethylethanolamine, N-butylethanolamine, N,N-diethylethanolamine, diethanolamine, N-methyldiethanolamine, N-ethyldiethanolamine, N-butyldiethanolamine, N-tert-butyldiethanolamine, triethanolamine, isopropanolamine, N,N-dimethylisopropanolamine, N,N-diethylisopropanolamine, diisopropanolamine, tripropanolamine, triisopropanolamine (TIPA), N,N-dimethylpropanolamine, 2-amino-1-propanol, 2-amino-2-methyl-1-propanol, 5-amino-1-pentanol, 2-amino-2-methyl-1,3-propanediol, 2-amino-2-hydroxymethyl-1,3-propanediol, 3-amino-1,2-propanediol, 3-methylmino-1,2-propanediol, tripropanolamine, tributanolamine, or a derivative of at least one of those mentioned above. Among those mentioned above, triethanolamine or triisopropanolamine is preferable, and triisopropanolamine is more preferable. The organic amines may be used alone, or at least two types thereof may be used in combination.

The organic acids and the organic amines may be used alone, or at least two types thereof may be used in combination. In addition, an organic acid salt in the form of a polyvalent metal salt is to be included in the polyvalent metal salt.

A total content of the compound selected from an organic acid and an organic amine with respect to the total mass of the treatment liquid is preferably 1 percent by mass or less, more preferably 0.0001 to 0.8 percent by mass, even more preferably 0.0005 to 0.7 percent by mass, further preferably 0.001 to 0.5 percent by mass, even further preferably 0.002 to 0.2 percent by mass, particularly preferably 0.01 to 0.1 percent by mass, and even particularly preferably 0.02 to 0.05 percent by mass. Alternatively, the total content described above is preferably 0.01 percent by mass or less and more preferably 0.005 percent by mass or less.

When the total content of the compound selected from an organic acid and an organic amine is in the range described above, the pH of the treatment liquid is likely to be controlled at 5.5 to 7.5. In addition, when the total content of the compound selected from an organic acid and an organic amine is in the range described above, the pH of the treatment liquid is likely to be stabilized at 5.5 to 7.5. From those points described above, the use of the compound described above is superior to the case in which an inorganic acid and/or an inorganic alkali is used.

In addition, the compound selected from an organic acid and an organic amine is preferably selected from an organic acid. Furthermore, in this case, the organic acid is more preferably a dicarboxylic acid. Accordingly, a color development property and an abrasion resistance of the image formed by the ink jet ink can be made more preferable.

In addition, depending on the type of polyvalent metal salt, although the pH may be set in a predetermined range without using an organic acid and/or an organic amine, the pH of the treatment liquid is liable to be varied during its storage without using an organic acid and/or an organic amine. In addition, in the treatment liquid according to this embodiment, since the compound is present together with the resin, the pH is more liable to be varied, and even when the content is slightly changed due to measurement error or the like, the pH may be seriously shifted in some cases. In the treatment liquid according to this embodiment, since the organic acid and/or the organic amine is used, the pH is likely to be controlled in a predetermined range, and even when the compound is present together with the resin, a pH stability during the storage is excellent.

In addition, when the pH is controlled using an inorganic acid, an inorganic alkali, or the like, the pH may be largely increased or decreased in some cases, the pH may be unlikely to be controlled in a predetermined range, and/or the pH may be liable to be varied; hence, the generation of foreign materials caused by the resin is concerned. When the pH is not controlled using an organic acid and/or an organic amine, and in particular, for example, when high temperature storage is performed, the pH of the treatment liquid tends to be increased or decreased, and the generation of foreign materials, such as calcium carbonate, and the generation of foreign materials from the resin are concerned.

1.4. pH of Treatment Liquid

The pH of the treatment liquid is 5.5 to 7.5. Since the pH of the treatment liquid is in the range described above, even when the lubricant is contained in the member in contact with the treatment liquid, the foreign materials are not likely to be generated. The pH of the treatment liquid is more preferably 5.7 to 7.4, even more preferably 6.0 to 7.0, and further preferably 6.3 to 7.0.

When the pH of the treatment liquid is higher than the range described above, a carbonate salt may be generated due to, for example, a reaction between the polyvalent metal salt and $CO_2$ in the air, and the generation of foreign materials therefrom is concerned. In particular, when the polyvalent metal salt is a calcium salt, calcium carbonate is liable to be generated, and the foreign materials may be unfavorably generated in some cases. On the other hand, when the pH of the treatment liquid is lower than the range described above, since the resin is liable to be aggregated, the resin is formed into foreign materials, and as a result, the storage stability of the treatment liquid and the stability thereof during ink jet ejection may be degraded in some cases. In addition, when the pH of the treatment liquid is higher than the range described above, the state of dispersion or dissolution of the resin may be made unstable in some cases.

In connection with the pH of the ink jet ink which will be described later, the pH of the treatment liquid has a more preferable range. That is, the difference in pH between the treatment liquid and the ink jet ink is preferably 3 or less. Furthermore, the difference in pH between the treatment liquid and the ink jet ink is more preferably 2.5 or less, even more preferably 2.0 or less, and further preferably 1.5 or less. A lower limit of the difference described above is 0 or more. In addition, the pH of the treatment liquid is preferably equal to or lower than the pH of the ink.

In addition, the difference in pH between the treatment liquid and the ink jet ink indicates a pH value obtained by subtracting a lower pH from a higher pH.

Since the difference in pH between the treatment liquid and the ink jet ink is set in the range described above, the pH of the ink jet ink is not excessively increased, and an aggregation property (reactivity) of at least one component of the ink jet ink can be more sufficiently obtained, and the abrasion resistance and the image quality of the image to be formed can be made more preferable.

In addition, since the difference in pH is set in the range described above, the pH of the treatment liquid is not excessively decreased, and the storage stability of the treatment liquid is made more excellent.

1.5. Water

The treatment liquid is a water-based treatment liquid and contains water. As the water, for example, pure water, such as ion exchange water, ultrafiltration water, reverse osmosis water, or distilled water; or water, such as ultrapure water, in which ionic impurities are reduced as much as possible may be mentioned. In addition, in the case in which water sterilized by UV radiation, addition of hydrogen peroxide, or the like is used, when the ink jet ink is stored for a long period of time, generation of bacteria and true fungi can be suppressed.

A content of the water with respect to the total mass of the treatment liquid is preferably 40 percent by mass or more, more preferably 45 percent by mass or more, even more preferably 50 percent by mass or more, and further preferably 60 percent by mass or more. In addition, although an upper limit of the content of the water is not particularly limited, for example, the upper limit described above with respect to the total mass of the treatment liquid is preferably 98 percent by mass or less, more preferably 90 percent by mass or less, even more preferably 85 percent by mass or less, and further preferably 80 percent by mass or less.

1.6. Other Components

The treatment liquid may also contain the following components.

1.6.1. Water-Soluble Low Molecular Weight Compound

The treatment liquid may contain a water-soluble low molecular weight compound. In the water-soluble low molecular weight compound in this section, a colorant, a polyvalent metal salt, an organic acid, and an organic amine are not included. The water-soluble low molecular weight compound primarily indicates an organic solvent and/or a solid compound.

A "water-soluble" compound indicates a compound having a solubility of more than 10 g in 100 g of water at 20° C. As the water-soluble low molecular weight compound, for example, there may be mentioned a compound in the form of a liquid at ordinary temperature and/or a compound in the form of a solid at ordinary temperature. Since the treatment liquid contains a water-soluble low molecular weight compound, a clogging recovery property of the treatment liquid, the storage stability thereof, the image quality, and the like can be made more excellent.

As a method to determine the solubility of the water-soluble low molecular weight compound is as described below. First, in an environment at 20° C., a predetermined amount of the water-soluble low molecular weight compound is mixed with 100 g of water and then stirred for 30 minutes. After the stirring is performed, when a phase separation or a sea-island structure is not observed in a liquid compound at ordinary temperature, the compound is judged to be dissolved. In addition, when a solid compound at ordinary temperature is dissolved without any residues, this compound is judged to be dissolved.

As described above, when a predetermined amount of the compound is mixed with 100 g of water, among the predetermined amounts judged to be dissolved in water, the largest predetermined amount is determined as the solubility. A compound having a solubility of more than 10 g is called a water-soluble low molecular weight compound. In addition, the water-soluble low molecular weight compound can also be a compound to be perfectly mixed with water or a compound to be mixed with water.

In this specification, "perfect mixing with water" indicates the case in which water and the compound are dissolved with each other, that is, the case in which the solubility of the compound in 100 g of water at 20° C. is infinite. In addition, "mixing with water" indicates the case in which water and the compound each have a finite solubility and indicates the case in which the solubility of the compound in 100 g of water at 20° C. is at least more than 10 g. In addition, although the solubility of the water-soluble low molecular weight compound is more than 10 g, an upper limit of the solubility is not limited and may also be infinite. The solubility is preferably 11 g or more and more preferably 50 g or more.

A molecular weight of the water-soluble low molecular weight compound is preferably 500 or less as the weight average molecular weight. Furthermore, the molecular weight described above is more preferably 400 or less and further preferably 300 or less. In addition, the treatment liquid preferably contains as the water-soluble low molecular weight compound, a compound having a standard boiling point of 150° C. to 350° C., and a compound having a standard boiling point of 150° C. to 300° C. is more preferable. In addition, as the water-soluble low molecular weight compound, a compound having a melting point of 90° C. or less is preferably contained, and a compound having a melting point of 80° C. or less is more preferably contained. In addition, the melting point described above is preferably −70° C. or more.

As the water-soluble low molecular weight compound having a solubility of more than 10 g in 100 g of water at 20° C., for example, a resin dissolving material, a polyol, or a glycol ether may be mentioned. As the resin dissolving material, for example, an amide, a sulfur-containing solvent, or a cyclic ether may be mentioned. In particular, a resin dissolving material, a polyol, or a glycol ether is preferable.

As the water-soluble low molecular weight compound, more preferably, there may be mentioned an amide, a sulfur-containing solvent, or a cyclic ether each having a standard boiling point of 150° C. to 300° C. or a polyol or a glycol ether each having a standard boiling point of 150° C. to 250° C.

The water-soluble low molecular weight compound is contained with respect to the total mass of the treatment liquid preferably at a content of 40 percent by mass or less, more preferably at a content of 1 percent by mass or more, even more preferably at a content of 5 to 30 percent by mass, and further preferably at a content of 10 to 25 percent by mass.

<Resin Dissolving Material>

As the water-soluble low molecular weight compound having a solubility of more than 10 g in 100 g of water at 20° C., a resin dissolving material, which is one of an amide, a sulfur-containing solvent, and a cyclic ether, may be mentioned. Among those mentioned above, a resin dissolving material, which is one of an amide, a sulfur-containing solvent, and a cyclic ether, having a standard boiling point of 150° C. to 300° C. is preferably contained. In addition, the resin dissolving material is an organic compound which dissolves a resin and which has a function to improve the abrasion resistance; however, the function thereof is not limited to that described above.

As the amide described above, for example, there may be mentioned a cyclic amide (lactam), such as 2-pyrrolidone (2P), 2-pyperidone, ε-caprolactam (CPL), N-methyl-ε-caprolactam, N-cyclohexyl-2-pyrrolidone, N-methylpyrrolidone, N-ethylpyrrolidone, N-butylpyrrolidone, 5-methyl-2-pyrrolidone, β-propiolactam, or ω-heptalactam; or a chain amide, such as N,N-dimethylacetamide, N,N-diethylacetamide, N-methylacetoacetamide, N,N-dimethylisobutyramide, N,N-dimethylformamide, N,N-diethylformamide, N,N-dimethylacetamide, N,N-diethylacetamide, N,N-dimethylpropionamide, 3-methoxy-N,N-dimethylpropaneamide (DMPA), 3-n-butoxy-N,N-dimethylpropionamide, 3-methoxy-N,N-diethylpropioneamide, 3-methoxy-N,N-methylethylpropioneamide, 3-ethoxy-N,N-dimethylpropioneamide, 3-ethoxy-N,N-diethylpropioneamide, 3-ethoxy-N,N-methylethylpropioneamide, 3-n-butoxy-N,N-diethylpropioneamide, 3-n-butoxy-N,N-methylethylpropioneamide, 3-n-propoxy-N,N-dimethylpropioneamide, 3-n-propoxy-N,N-diethylpropioneamide, 3-n-propoxy-N,N-methylethylpropioneamide, 3-iso-propoxy-N,N-dimethylpropioneamide, 3-iso-propoxy-N,N-diethylpropioneamide, 3-iso-propoxy-N,N-methylethylpropioneamide, 3-tert-butoxy-N,N-dimethylpropioneamide, 3-tert-butoxy-N,N-diethylpropioneamide, or 3-tert-butoxy-N,N-methylethylpropioneamide. Among those mentioned above, 2-pyrrolidone (2P), ε-caprolactam (CPL), or 3-methoxy-N,N-dimethylpropaneamide (DMPA) is more preferable, and the storage stability of the ink tends to be made more excellent.

As the sulfur-containing solvent, for example, there may be mentioned 3-methylsulfolane, sulfolane, ethyl isopropyl sulfone, ethyl methyl sulfone, dimethyl sulfone, dimethylsulfoxide (DMSO), diethylsulfoxide, tetramethylene sulfoxide, or methyl phenyl sulfoxide. Among those mentioned above, dimethylsulfoxide (DMSO) is more preferable, and the storage stability of the ink tends to be made more excellent.

As the cyclic ether described above, for example, there may be mentioned isosorbide dimethyl ether, 3-methyl-3-oxetanemethanol, 3-ethyl-3-oxetanemethanol (DMHD), 2-hydroxymethyloxetane, tetrahydrofurfuryl alcohol, solketal, glycerol formal, 1,4-dioxane-2,3-diol, or dihydrolevoglucosenone. Among those mentioned above, 3-ethyl-3-oxetanemethanol (DMHD) is more preferable, and the storage stability of the ink tends to be more excellent.

Among those mentioned above, a resin dissolving material which is an amide having a standard boiling point of 150° C. to 300° C. is preferable since the storage stability tends to be made more excellent. In addition, the resin dissolving material is preferably a compound having a melting point of 80° C. or less. When the melting point is in the range described above, the clogging recovery property tends to be made excellent.

The treatment liquid contains as the water-soluble low molecular weight compound, a resin dissolving material which is an amide, a sulfur-containing solvent, or a cyclic ether with respect to the total mass of the treatment liquid preferably at a content of 20 percent by mass or less, more preferably at a content of 15 percent by mass or less, even more preferably at a content of 10 percent by mass or less, and further preferably at a content of 5 percent by mass or less. In addition, a lower limit of the content described above is 0 percent by mass or more, preferably 1 percent by mass or more, more preferably 2 percent by mass or more, and further preferably 3 percent by mass or more.

In addition, a content of the resin dissolving material which is an amide, a sulfur-containing solvent, or a cyclic ether having a standard boiling point of 150° C. to 300° C. may be controlled in the range described above. When the content of the resin dissolving material is in the range described above, the solubility of the resin is improved in the treatment liquid, and the storage stability and the abrasion resistance tend to be made more excellent. On the other hand, when the content described above is more than the range described above, the storage stability may be degraded in some cases. The reason for this is believed that since the content of the water in the treatment liquid is relatively decreased, the resin is not likely to be dissolved.

<Polyol and Glycol Ether>

The treatment liquid may contain as the water-soluble low molecular weight compound other than the resin dissolving material described above, a compound which is a polyol or a glycol ether. In particular, a compound which is a polyol or a glycol ether having a standard boiling point of 150° C. to 250° C. is preferably contained.

(Polyol)

The polyol is preferably a glycol or a compound formed by intermolecular condensation between hydroxy groups of glycol molecules. In the case described above, the polyol is a compound having two hydroxy groups. In addition, as the polyol, there may be mentioned a compound in which at least one hydrogen atom of a glycol or a compound formed by intermolecular condensation between hydroxy groups of glycol molecules is replaced by at least one hydroxy group. In the case described above, the polyol is a compound having at least 3 hydroxy groups.

A glycol forming a polyol or a glycol unit in a compound formed by intermolecular condensation between hydroxy groups of glycol molecules has preferably 2 to 10 carbon atoms and more preferably 3 to 8. In addition, the polyol has in its molecule, preferably 2 to 15 carbon atoms and more preferably 3 to 10 carbon atoms. In addition, the polyol preferably has a standard boiling point of 150° C. to 250° C.

As the polyol having a standard boiling point of 150° C. to 250° C., for example, there may be mentioned ethylene glycol (standard boiling point: 198° C., mixing with water), diethylene glycol (standard boiling point: 244° C., perfect mixing with water), 1,2-propanediol (propylene glycol) (standard boiling point: 188° C., perfect mixing with water), dipropylene glycol (standard boiling point: 227° C., perfect mixing with water), 1,2-butanediol (standard boiling point: 193° C., mixing with water), 1,2-pentanediol (standard boiling point: 210° C., mixing with water), 1,2-hexanediol (standard boiling point: 224° C., perfect mixing with water), 1,3-propanediol (standard boiling point: 214° C., perfect mixing with water), 1,4-butanediol (standard boiling point: 228° C., perfect mixing with water), 2,3-butanediol (standard boiling point: 177° C., mixing with water), 1,3-butylene glycol (standard boiling point: 207° C., perfect mixing with water), 3-methyl-1,3-butanediol (standard boiling point: 203° C., perfect mixing with water), 2-methyl-1,3-propanediol (standard boiling point: 214° C., perfect mixing with water), 2,2-dimethyl-1,3-propanediol (standard boiling point: 208° C., solubility: 83 [g/100 g of water]), 2-methylpentane-2,4-diol (standard boiling point: 197° C., perfect mixing with water), 2,5-dimethyl-2,5-hexanediol (standard boiling point: 218° C., solubility: 14 [g/100 g of water]), 1,5-pentanediol (standard boiling point: 242° C., mixing with water), 3-methyl-1,5-pentanediol (standard boiling point: 250° C., perfect mixing with water), or 1,6-hexanediol (standard boiling point: 250° C., mixing with water). As the polyol, a polyol having 10 carbon atoms or less is more preferable.

Among the polyols, an alkanediol having a standard boiling point of 150° C. to 250° C. and 10 carbon atoms or less is more preferable, and an alkanediol having a standard boiling point of 150° C. to 250° C. and 6 carbon atoms or less is further preferable. As the alkanediols as described above, for example, there may be mentioned a 1,2-alkanediol, such as ethylene glycol, propylene glycol, 1,2-propanediol, 1,2-butanediol, 1,2-pentanediol, or 1,2-hexanediol; or 1,3-propanediol or 1,3-butylene glycol.

The treatment liquid preferably contains as the water-soluble low molecular weight compound, an alkanediol having a standard boiling point of 150° C. to 250° C. and 6 carbon atoms or less at a content of 1 to 5 percent by mass with respect to the total mass of the treatment liquid.

(Glycol Ether)

The glycol ether is a compound in which at least one hydroxy group of a glycol is etherified. As the glycol ether described above, for example, a monoether or a diether of an alkylene glycol is preferable. As the etherified ether described above, an alkyl ether is preferable. An alkylene of an alkylene glycol or an alkyl of an alkyl ether, each of which forms the glycol ether, independently preferably has 1 to 5 carbon atoms and more preferably has 2 to 4 carbon atoms. The glycol ether also more preferably has a standard boiling point of 150° C. to 250° C.

As the glycol ether, for example, there may be mentioned an alkylene glycol monoalkyl ether, such as ethylene glycol monomethyl ether (perfect mixing with water), ethylene glycol monoethyl ether (mixing with water), ethylene glycol monoisopropyl ether (solubility: 100 [g/100 g of water]), ethylene glycol monopropyl ether (mixing with water), ethylene glycol monoisobutyl ether (solubility: 75.5 [g/100 g of water]), ethylene glycol mono-tert-butyl ether (mixing with water), ethylene glycol monobutyl ether (solubility: 100 [g/100 g of water]), diethylene glycol monomethyl ether (perfect mixing with water), diethylene glycol monoethyl ether (perfect mixing with water), diethylene glycol monoisopropyl ether (mixing with water), diethylene glycol monoisobutyl ether (perfect mixing with water), diethylene glycol monobutyl ether (perfect mixing with water), triethylene glycol monomethyl ether (perfect mixing with water), triethylene glycol monoethyl ether (perfect mixing with water), triethylene glycol monobutyl ether (mixing with water), tetraethylene glycol monomethyl ether (mixing with water), propylene glycol monomethyl ether (mixing with water), propylene glycol monoethyl ether (perfect mixing with water), propylene glycol monopropyl ether (mixing with water), dipropylene glycol monomethyl ether (perfect mixing with water), dipropylene glycol monopropyl ether (solubility: 19 [g/100 g of water]), tripropylene glycol monomethyl ether (perfect mixing with water), 1,3-propanedil monomethyl ether (3-methoxy-1-propanol) (perfect mixing with water), or 1,3-butylene glycol-3-monomethyl ether (3-methoxy-1-butanol) (mixing with water); or an alkylene glycol dialkyl ether (glyme), such as ethylene glycol dimethyl ether (perfect mixing with water), diethylene glycol dimethyl ether (perfect mixing with water), diethylene glycol methylethyl ether (perfect mixing with water), diethylene glycol diethyl ether (perfect mixing with water), triethylene glycol dimethyl ether (perfect mixing with water), tetraethylene glycol dimethyl ether (perfect mixing with water), dipropylene glycol dimethyl ether (solubility: 52.6 [g/100 g of water]), or tripropylene glycol dimethyl ether (solubility: 23.6 [g/100 g of water]).

In addition, compared to a monoether of the glycol ether mentioned above, a diether thereof tends to easily dissolve or swell the resin in the treatment liquid, and the abrasion resistance of the image to be formed is more preferably improved. On the other hand, the monoether described above is preferably superior in terms of wet spreadability of the treatment liquid.

The treatment liquid contains as the water-soluble low molecular weight compound, one of the polyol and the glycol ether preferably at a content of 30 percent by mass or less and more preferably at a content of 25 percent by mass or less with respect to the total mass of the treatment liquid. In addition, as a lower limit, the content described above with respect to the total mass of the treatment liquid is 0 percent by mass or more, preferably 10 percent by mass or more, and more preferably 15 percent by mass or more.

In addition, a content of one of the polyol and the glycol ether having a standard boiling point of 150° C. to 250° C. is preferably set in the range described above.

When at least one of those water-soluble low molecular weight compounds is contained in the range described above, the solubility of the resin is made more preferable, and the storage stability tends to be made more excellent.

<Other Compounds>

The treatment liquid may contain, if needed, other materials.

1.6.2. Surfactant

The treatment liquid may contain a surfactant. Although the surfactant is not particularly limited, for example, an acetylene glycol-based surfactant, a fluorine-based surfactant or a silicone-based surfactant may be mentioned.

The acetylene glycol-based surfactant is not particularly limited, and for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products Japan K.K.); Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (trade name, manufactured by Nisshin Chemical Industry Co., Ltd.); or Acetylenol E00, E00P, E40, or E100 (trade name, manufactured by Kawaken Fine Chemicals Co., Ltd.).

As the fluorine-based surfactant, a fluorine modified polymer is preferably used, and as a concrete example, there may be mentioned BYK-340 (trade name, manufactured by BYK Japan KK).

The silicone-based surfactant is not particularly limited, and a polysiloxane-based compound is preferably mentioned. Although the polysiloxane-based compound is not particularly limited, for example, a polyether modified organosiloxane may be mentioned. As a commercial product of the polyether-modified organosiloxane, for example, there may be mentioned BYK-306, BYK-307, BYK-333, BYK-341, BYK-345, BYK-346, or BYK-348 (trade name, manufactured by BYK Japan KK); KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.); or Silface SAG503A or Silface SAG014 (trade name, manufactured by Nisshin Chemical Industry Co., Ltd.).

The surfactants mentioned above may be used alone, or at least two types thereof may be used in combination.

When the surfactant is contained, a content thereof with respect to the total mass of the treatment liquid is preferably set to 0.1 to 1.5 percent by mass.

In addition, among the surfactants described above, the content of the silicone-based surfactant or the fluorine-based surfactant is also preferably set in the range described above. Furthermore, among the surfactants described above, the content of the silicone-based surfactant is also preferably set in the range described above.

In general, when the silicone-based surfactant is contained in the treatment liquid, although the image quality tends to be further improved, the abrasion resistance and a defoaming property are liable to be degraded. However, in the treatment liquid according to this embodiment, even when the addition amount of the silicone-based surfactant is small as shown in the range described above, the image quality can be made excellent, and in addition, the abrasion resistance can also be made preferable.

1.6.3. Other Additives

The treatment liquid may also contain, if needed, various types of additives, such as a chelating agent, an antirust agent, a fungicide, an antioxidant, a reduction inhibitor, and/or an evaporation accelerator.

(Re: Polyol Having Standard Boiling Point of More than 280° C.)

As the water-soluble low molecular weight compound, the treatment liquid preferably contains no polyol having a standard boiling point of more than 280° C. at a content of more than 3 percent by mass with respect to the total mass of the treatment liquid. In addition, the content described above is set to more preferably more than 1 percent by mass and further preferably more than 0.5 percent by mass.

In the case described above, the polyol having a standard boiling point of more than 280° C. may be either contained or not contained in the treatment liquid, and even when the polyol described above is contained, the content thereof is set to be equal to or lower than that described above. When the content of the polyol having a standard boiling point of more than 280° C. is in the range described above, a drying property of the treatment liquid can be prevented from being seriously degraded, and as a result, even when the recording is performed on a low-absorbing or a non-absorbing recording medium, a fixability of the image tends to be suppressed from being degraded. In addition, even when a temperature of the recording medium in heat drying is set to a relatively low value, a sufficient drying can be performed. As the polyol having a standard boiling point of more than 280° C., for example, glycerin (standard boiling point: 290° C.) may be mentioned, and an alkanolamine such as triisopropanolamine is not included in this specification.

1.7. Preparation and Physical Properties of Treatment Liquid

The treatment liquid can be obtained in such a manner that the components described above are mixed together in an arbitrary order, and if needed, impurities are removed by filtration or the like. As a mixing method of the components, a method in which after raw materials are sequentially charged in a container equipped with a stirring device, such as a mechanical stirrer or a magnetic stirrer, stirring and mixing are performed is preferably used. As a filtration method, for example, a centrifugal filtration or a filter filtration may be performed, if needed.

In order to further improve the image quality of the ink jet ink, the treatment liquid has a surface tension (static surface tension) at 20° C. of preferably 18 to 40 mN/m, more preferably 20 to 35 mN/m, and further preferably 22 to 33 mN/m. In addition, the surface tension can be measured using an automatic surface tensiometer CBVP-Z (trade name, manufactured by Kyowa Interface Science Co., Ltd.) or the like such that the surface tension is confirmed when a platinum plate is wetted with the treatment liquid in an environment at 20° C.

From the same point as described above, the treatment liquid has a viscosity at 20° C. of preferably 3 to 10 mPa·s and more preferably 3 to 8 mPa·s. In addition, the viscosity can be measured in an environment at 20° C. using a viscoelastic tester MCR-300 (trade name, manufactured by Pysica) or the like.

1.8. Application of Treatment Liquid and Ink Set

The treatment liquid is used for recording together with the ink jet ink. The treatment liquid may be adhered in advance to a medium to which the ink jet ink is to be adhered. In addition, as is the case of the ink jet ink, the treatment liquid may be ejected from an ink jet head for the recording. Accordingly, the usage of the treatment liquid can be reduced.

In addition, the treatment liquid is able to form an ink set together with the ink jet ink. That is, the ink set includes the treatment liquid and the ink jet ink. The ink set is a set of the ink and the treatment liquid each of which is used for the recording.

According to this ink set, even when the lubricant is contained in the member in contact with the treatment liquid, the generation of foreign materials is not likely to occur. In addition, the image quality of the image to be formed by the ink jet ink can be made preferable.

2. Recording Method

Hereinafter, a recording method using the treatment liquid and the ink jet ink will be described. A recording method according to this embodiment is a recording method to be performed using the above treatment liquid and the ink jet ink which will be described below and includes a treatment liquid adhesion step of adhering the treatment liquid to a recording medium and an ink adhesion step of ejecting the ink jet ink from an ink jet head so as to be adhered to the recording medium.

2.1. Ink Jet Ink

The ink jet ink used together with the treatment liquid is a water-based ink composition. The ink jet ink may contain the following components.

2.1.1. Colorant

The ink jet ink may contain a colorant. As the colorant, a pigment and/or a dye can be used.

<Pigment>

As the pigment, an inorganic pigment and an organic pigment can both be used. When the pigment is used as the colorant, a light resistance of the ink jet ink may be preferably improved in some cases.

As the inorganic pigment, for example, a carbon black (C.I. Pigment Black 7), such as a furnace black, a lamp black, an acetylene black, or a channel black, or an iron oxide, or a titanium oxide may be used.

As the organic pigment, for example, there may be mentioned an azo pigment, such as an insoluble azo pigment, a condensed azo pigment, an azo lake, or a chelating azo pigment; a polycyclic pigment, such as a phthalocyanine pigment, a perylene pigment, a perinone pigment, an anthraquinone pigment, a quinacridone pigment, a dioxane pigment, a thioindigo pigment, an isoindolinone pigment, or a quinophthalone pigment; a dye chelate (such as a basic dye chelate or an acidic dye chelate), a dye lake (such as a basic dye lake or an acidic dye lake), a nitro pigment, a nitroso pigment, an aniline black, or a daylight fluorescent pigment.

Furthermore, as a carbon black used as a black ink, for example, there may be mentioned No. 2300, No. 900, MCF88, No. 33, No. 40, No. 45, No. 52, MA7, MA8, MA100, or No. 2200B (manufactured by Mitsubishi Chemical Corporation); or Raven 5750, Raven 5250, Raven 5000, Raven 3500, Raven 1255, or Raven 700 (manufactured by Carbon Columbia).

As a pigment used for a white ink, C.I. Pigment 6, 18, or 21 may be mentioned.

As a pigment used for a yellow ink, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, or 180.

As a pigment used for a magenta ink, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245; or C.I. Pigment Violet 19, 23, 32, 33, 36, 38, 43, or 50. A solid solution formed from at least two of those pigments mentioned above may also be used.

As a pigment used for a cyan ink, for example, there may be mentioned C.I. Pigment Blue 1, 2, 3, 15, 15:1, 15:2, 15:3, 15:4, 16, 18, 22, 25, 60, 65, or 66; or C.I. Vat Blue 4 or 60.

As a pigment other than magenta, cyan, and yellow, for example, there may be mentioned C.I. Pigment Green 7 or 10; C.I. Pigment Brown 3, 5, 25, or 26; or C.I. Pigment Orange 1, 2, 5, 7, 13, 14, 15, 16, 24, 34, 36, 38, 40, 43, or 63.

The pigments mentioned above may be used alone, or at least two types thereof may be used in combination.

When the pigment is used for the ink jet ink, an average particle diameter thereof is preferably 300 nm or less and more preferably 50 to 200 nm. When the average particle diameter is in the range described above, the reliability, such as the ejection stability and/or the dispersion stability, of the ink jet ink can be made more excellent, and in addition, an image having an excellent image quality is likely to be formed. In addition, the average particle diameter in this specification may be measured by a dynamic light scattering method.

[Pigment Dispersion]

The pigment mentioned above may be present in the form of a pigment dispersion in which the pigment is dispersed in the ink jet ink. In addition, the pigment dispersion of this specification indicates a concept including a pigment dispersion liquid and a slurry (low viscosity aqueous dispersion) of the pigment.

Although the pigment dispersion is not particularly limited, for example, a self-dispersible pigment, a polymer-dispersion pigment, and/or a pigment covered with a polymer may be mentioned.

(Self-Dispersible Pigment)

The self-dispersible pigment is a pigment which can be dispersed or dissolved in an aqueous medium without using a dispersant. In addition, "dispersed or dissolved in an aqueous medium without using a dispersant" indicates the state in which even when a dispersant to disperse a pigment is not used, the pigment is stably present in an aqueous medium because of a hydrophilic group on the surface of the pigment. Hence, foaming caused by degradation in defoaming property due to a dispersant hardly occurs, and an ink excellent in ejection stability is likely to be prepared. In addition, since a large increase in viscosity caused by a dispersant can be suppressed, a larger amount of the pigment can be contained, and the ink jet ink can be easily handled such that a print density can be sufficiently increased.

The hydrophilic group described above is preferably at least one selected from the group consisting of —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$.

In addition, in the chemical formulas mentioned above, M represents a hydrogen atom, an alkali metal, ammonium, a substituted or unsubstituted phenyl group, or an organic ammonium, and R represents an alkyl group having 1 to 12 carbon atoms or a substituted or unsubstituted naphthyl group. In addition, the above M and R are selected independently from each other.

The self-dispersible pigment is manufactured, for example, by performing a physical treatment or a chemical treatment on the pigment so as to bind (graft) the hydrophilic group on the surface of the pigment. As the physical treatment described above, for example, a vacuum plasma treatment may be mentioned. In addition, as the chemical treatment, for example, there may be mentioned a wet oxidation method in which oxidation is performed in water using an oxidant or a method in which by binding p-aminobenzoic acid on a pigment surface, a carboxy group is bound thereto with a phenyl group interposed therebetween.

(Polymer-Dispersion Pigment)

The polymer-dispersion pigment is a pigment dispersible by polymer dispersion. Although a polymer used for the polymer-dispersion pigment is not limited to the following, for example, a dispersion polymer used for the dispersion of the pigment has a glass transition temperature (Tg) of preferably 80° C. or less and more preferably 75° C. or less. When the Tg described above is 80° C. or less, the fixability of the ink may be made preferable in some cases.

In addition, a weight average molecular weight of the polymer by a gel permeation chromatography (GPC) is preferably 10,000 to 200,000. Accordingly, the storage stability of the ink may be made further preferable in some cases. In addition, the weight average molecular weight (Mw) in this specification may be measured as a weight average molecular weight on a polystyrene basis using a gel permeation chromatography (GPC) of L7100 system manufactured by Hitachi, Ltd.).

As the polymer described above, since the fixability and glossiness of the ink tend to be made more excellent, a polymer in which at least 70 percent by mass of constituent components thereof is a copolymer between (meth)acrylate and (meth)acrylic acid is preferable. The polymer described above is preferably formed by polymerization from a monomer component including at least 70 percent by mass of an alkyl (meth)acrylate 1 to 24 carbon atoms and/or a cyclic alkyl (meth)acrylate having 3 to 24 carbon atoms. Although a concrete example of the monomer component is not particularly limited, for example, there may be mentioned methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, or behenyl (meth)acrylate. In addition, as another polymerization monomer component, for example, a hydroxy (meth)acrylate having a hydroxyl group, such as hydroxyethyl (meth)acrylate, hydroxypropyl (meth)acrylate, or diethylene glycol (meth)acrylate; or urethane (meth)acrylate or epoxy (meth)acrylate may also be used.

In addition, in this specification, the description of (meth)acryl indicates acryl and/or methacryl. The description of (meth)acrylate indicates acrylate and/or methacrylate.

(Pigment Covered with Polymer)

In addition, since the fixability, glossiness, and color reproducibility of the ink tend to be made excellent, among the polymer-dispersion pigments described above, a pigment covered with a polymer, that is, a microencapsulated pigment, is preferably used.

The pigment covered with a polymer is obtained by a phase-transfer emulsification method. That is, the polymer described above is dissolved in an organic solvent, such as methanol, ethanol, isopropyl alcohol, n-butanol, acetone, methyl ethyl ketone, or dibutyl ether. After the pigment is added to the solution thus obtained, a neutralizer and water are added thereto, and a kneading/dispersing treatment is performed, so that an oil-in-water type dispersion is prepared. In addition, since the organic solvent is removed from the dispersion thus obtained, the pigment covered with a polymer can be obtained as a water dispersion. The kneading/dispersing treatment can be performed, for example, using a ball mill, a roll mill, a bead mill, a high-pressure homogenizer, or a high-speed stirring type dispersing machine.

As the neutralizer, for example, ethylamine, a tertiary amine such as trimethylamine, lithium hydroxide, sodium hydroxide, potassium hydroxide, or ammonia is preferable. A pH of the water dispersion thus obtained is preferably 6 to 10.

As the polymer to cover the pigment, a polymer having a weight average molecular weight of approximately 10,000 to 150,000 measured by a GPC is preferable since the pigment is stably dispersed.

<Dye>

A dye is not particularly limited, and for example, an acidic dye, a direct dye, a reactive dye, and a basic dye may be used. As the dye, for example, there may be mentioned C.I. Acid Yellow 17, 23, 42, 44, 79, or 142, C.I. Acid Red 52, 80, 82, 249, 254, or 289, C.I. Acid Blue 9, 45, or 249, C.I. Acid Black 1, 2, 24, or 94, C.I. Food Black 1 or 2, C.I. Direct Yellow 1, 12, 24, 33, 50, 55, 58, 86, 132, 142, 144, or 173, C.I. Direct Red 1, 4, 9, 80, 81, 225, or 227, C.I. Direct Blue 1, 2, 15, 71, 86, 87, 98, 165, 199, or 202, C.I. Direct Black 19, 38, 51, 71, 154, 168, 171, or 195, C.I. Reactive Red 14, 32, 55, 79, or 249, or C.I. Reactive Black 3, 4, or 35.

The dyes mentioned above may be used alone, or at least two types thereof may be used in combination.

A content of the colorant (solid content) with respect to a total mass of the ink jet ink is, for example, preferably 1 percent by mass or more, more preferably 2 percent by mass or more, and further preferably 3 percent by mass or more. In addition, the content of the colorant (solid content) with respect to the total mass of the ink jet ink is preferably 10 percent by mass or less, more preferably 8 percent by mass or less, and further preferably 6 percent by mass or less. In addition, the content of the colorant described above is preferably 5 percent by mass or more. When the content of the colorant is in the range described above, the storage stability may be made more excellent in some cases.

2.1.2. Water

The ink jet ink is a water-based ink jet ink (water-based ink) and contains water. A "water-based" composition is a composition containing water as one primary solvent. Since the water is the same as described in the section of the treatment liquid, description thereof is omitted.

2.1.3. Other Components (Water-Soluble Low Molecular Weight Compound)

The ink jet ink may contain a water-soluble low molecular weight compound. Since the ink jet ink contains a water-soluble low molecular weight compound, the clogging recovery property of the ink, the storage stability thereof, the image quality, and the like are likely to be made excellent. Since a concrete example of the water-soluble molecular weight compound is similar to that described in the section of the treatment liquid, description thereof is omitted. A content of the water-soluble low molecular weight compound in the ink is preferably 0.5 to 40 percent by mass, more preferably 1 to 30 percent by mass, and further preferably 5 to 20 percent by mass.

(Surfactant)

The ink jet ink may contain a surfactant. Since a concrete example of the surfactant is similar to that described in the section of the treatment liquid, description thereof is omitted.

(Resin)

The ink jet ink may contain a resin. The resin can be blended as a water-soluble resin or an emulsion of resin particles. The resin as described above may function in some cases as a so-called fixing resin which improves the adhesion and the abrasion resistance of the components of a pigment ink adhered to a recording medium. As the resin, an emulsion of resin particles is preferable.

As the resin, for example, there may be mentioned a resin, such as an urethane-based resin, an acrylic-based resin, a fluorene-based resin, a polyolefin-based resin, a rosin-modified resin, a terpene-based resin, a polyester-based resin, a polyamide-based resin, an epoxy-based resin, a vinyl chloride-based resin, an ethylene-vinyl acetate-based resin, a vinyl acetate resin, a butadiene resin, a styrene resin, a cross-linked acrylic resin, a cross-linked styrene resin, a benzoguanamine resin, a phenol resin, a silicone resin, an epoxy resin, a paraffin resin, or a fluorine resin. In addition, although being frequently handled in the form of an emulsion, those resins each may also be in the form of a powder. In addition, the resins may be used alone, or at least two types thereof may be used in combination.

The urethane-based resin is a generic name of resins having an urethane bond. As the urethane-based resin, there may be used a polyether type urethane resin having an ether bond in its main chain besides an urethane bond, a polyester type urethane resin having an ester bond in its main chain besides an urethane bond, or a polycarbonate type urethane resin having a carbonate bond in its main chain besides an urethane bond. In addition, as the urethane-based resin, a commercial product may also be used, and for example, the commercial product may be selected from Superflex 210, 460, 460s, 840, and E-4000 (trade name, manufactured by DKS Co., Ltd.); Resamine D-1060, D-2020, D-4080, D-4200, D-6300, and D-6455 (trade name, manufactured by Dainichiseika Color & Chemicals Mfg. Co., Ltd.); Takelac WS-6020, WS-6021, and W-512-A-6 (trade name, manufactured by Mitsui Chemicals & Polyurethanes, Inc.); Suncure 2710 (trade name, manufactured by LUBRIZOL); and Permarine UA-150 (trade name, manufactured by Sanyo Chemical Industries, Ltd.).

The acrylic-based resin is a generic name of polymers each obtained by polymerizing at least one acrylic-based monomer, such as (meth)acrylic acid or a (meth)acrylic acid ester, as one component, and for example, a resin obtained from an acrylic-based monomer or a copolymer obtained by copolymerization between an acrylic-based monomer and another monomer may be mentioned. For example, an acryl vinyl-based resin which is a copolymer between an acrylic-based monomer and a vinyl-based monomer may be mentioned. In addition, for example, a copolymer with a vinyl monomer, such as styrene, may be mentioned. As the acryl-based monomer, for example, acrylamide or acrylonitrile may also be used.

As a resin emulsion formed using an acrylic-based resin as a raw material, a commercial product may also be used, and for example, the commercial product selected from FK-854 (trade name, manufactured by Chuorika Kougyo Co., Ltd.); Movinyl 952B and 718A (trade name, manufactured by Nippon Synthetic Chemical Industry Co., Ltd.); and Nipol LX852 and LX874 (trade name, manufactured by Zeon Corporation); Polysol AT860 (manufactured by Showa Denko K.K.); and Voncoat AN-11905, YG-651, AC-501, AN-1170, and 4001 (trade name, acrylic-based resin emulsion, manufactured by DIC Corporation) may also be used.

In addition, the acrylic-based resin may also include a styrene-acrylic-based resin as described above. In addition, in this specification, (meth)acryl indicates acryl and/or methacryl.

The styrene-acrylic-based resin is a copolymer obtained from a styrene monomer and an acrylic-based monomer, and for example, there may be mentioned a styrene-acrylic acid copolymer, a styrene-methacrylic acid copolymer, a styrene-methacrylic acid-acrylic acid ester copolymer, a styrene-α-methylstyrene-acrylic acid copolymer, or a styrene-α-methylstyrene-acrylic acid-acrylic acid ester copolymer. As the styrene-acrylic-based resin, a commercial product may also be used, and for example, there may be mentioned Joncryl 62J, 7100, 390, 711, 511, 7001, 631, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); or Movinyl 966A or 975N (trade name, manufactured by Nippon Synthetic Chemical Industry Co., Ltd.).

The vinyl chloride-based resin may also be a vinyl chloride-vinyl acetate copolymer.

The polyolefin-based resin is a resin having a structural skeleton of an olefin, such as ethylene, propylene, or butylene, and one appropriately selected from known polyolefin-based resins may be used. As the polyolefin-based resin, a commercial product may also be used, and for example, Arrowbase CB-1200 or CD-1200 (trade name, manufactured by Unitika Ltd.) may be selectively used.

In addition, the resin may be supplied in the form of an emulsion, and as an example of a commercial product of the resin emulsion as described above, for example, the commercial product may be selected from Microgel E-1002 and E-5002 (trade name, styrene-acrylic-based resin emulsion, manufactured by Nippon Paint Co., Ltd.); Voncoat AN-1190S, YG-651, AC-501, AN-1170, 4001, and 5454 (trade name, styrene-acrylic-based resin emulsion, manufactured by DIC Corporation); Polysol AM-710, AM-920, AM-2300, AP-4735, AT-860, and PSASE-4210E (acrylic-based resin emulsion), Polysol AP-7020 (styrene-acrylic resin emulsion), Polysol SH-502 (vinyl acetate resin emulsion), Polysol AD-13, AD-2, AD-10, AD-96, AD-17, and AD-70 (ethylene/vinyl acetate resin emulsion), and Polysol PSASE-6010 (ethylene/vinyl acetate resin emulsion) (trade name, manufactured by Showa Denko K.K.); Polysol SAE1014 (trade name, styrene-acrylic-based resin emulsion, manufactured by Zeon Corporation); Saivinol SK-200 (trade name, acrylic-based resin emulsion, manufactured by Saiden Chemical Industry Co., Ltd.); AE-120A (trade name, acrylic resin emulsion, manufactured by JSR Corporation); AE373D (trade name, carboxy-modified styrene-acrylic resin emulsion, manufactured by Emulsion Technology Co., Ltd.); Seikadyne 1900W (trade name, ethylene-vinyl acetate resin emulsion, manufactured by Dainichiseika Color & Chemicals Mfg. Co., Ltd.); Vinyblan 2682 (acrylic resin emulsion), Vinyblan 2886 (vinyl acetate-acrylic resin emulsion), and Vinyblan 5202 (acetic acid-acrylic resin emulsion) (trade name, manufactured by Nisshin Chemical Industry Co., Ltd.); Vinyblan 700 and 2586 (manufactured by Nisshin Chemical Industry Co., Ltd.); Elitel KA-5071S, KT-8803, KT-9204, KT-8701, KT-8904, and KT-0507 (trade name, polyester resin emulsion, manufactured by Unitika Ltd.); Hitec SN-2002 (trade name, polyester resin emulsion, manufactured by Toho Chemical Industry Co., Ltd.); Takelac W-6020, W-635, w-6061, W-605, W-635, and W-6021 (trade name, urethane-based resin emulsion, manufactured by Mitsui Chemicals Polyurethane); Superflex 870, 800, 150, 420, 460, 470, 610, 620, and 700 (trade name, urethane-based resin emulsion, manufactured by DKS Co., Ltd.): Permarine UA-150 (urethane-based resin emulsion, manufactured by Sanyo Chemical Industries, Ltd.); Suncure 2710 (urethane-based resin, manufactured by Lubrizol Japan Ltd.); NeoRez R-9660, R-9637, and R-940 (urethane-based resin emulsion, manufactured by Kusumoto Chemicals, Ltd.); Adekabontighter HUX-380 and 290K (urethane-based resin emulsion, manufactured by ADEKA Corporation); Movinyl 966A and Movinyl 7320 (manufactured by Nippon Synthetic Chemical Industry Co., Ltd.); Joncryl 7100, 390, 711, 511, 7001, 631, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (manufactured by BASF); NK Binder R-5HN (manufactured by Shin-Nakamura Chemical Co., Ltd.); and Hydran WLS-210 (non-crosslinked polyurethane, manufactured by DIC Corporation).

Among those resins mentioned above, an acrylic-based resin is preferable, and a styrene-acrylic-based resin is more preferable. When the resin is as described above, the abrasion resistance tends to be made more excellent.

In addition, a glass transition temperature (Tg) of the resin is preferably 60° C. or more, more preferably 70° C. or more, even more preferably 80° C. or more, and further preferably 90° C. or more. On the other hand, the glass transition temperature described above is preferably 120° C. or less, more preferably 115° C. or less, even more preferably 110° C. or less, and further preferably 105° C. or less. When the glass transition temperature (Tg) of the resin is in the range described above, banding irregularity can be further suppressed, and the abrasion resistance may be made more excellent in some cases.

In addition, the glass transition temperature (Tg) of the resin can be confirmed by a general method using a differential scanning calorimeter (DSC) analysis or the like.

A content of the resin with respect to the total mass of the ink jet ink is as a solid content, preferably 0.1 to 20 percent by mass, more preferably 1.0 to 15.0 percent by mass, even more preferably 2.0 to 10.0 percent by mass, and further preferably 3.0 to 8.0 percent by mass.

(Wax)

The ink jet ink may contain a wax. As the wax, for example, a wax dissolved in the ink or a wax dispersed in the form of fine particles like an emulsion may be mentioned. Since the wax as described above is used, a recorded matter having a more excellent abrasion resistance tends to be obtained. In particular, since the wax is present on the surface of an ink coating film on the recording medium, that is, is localized at the interface between air and the ink coating film, the abrasion resistance tends to be improved thereby.

Although the wax as described above is not particularly limited, for example, there may be mentioned an ester wax between a higher aliphatic acid and a higher monovalent or divalent alcohol, a paraffin wax, a microcrystalline wax, a polyolefin wax, or a mixture of those mentioned above.

As the polyolefin wax, for example, a wax manufactured from an olefin, such as ethylene, propylene, or butylene, or a derivative thereof or a copolymer thereof may be mentioned, and in particular, for example, a polyethylene-based wax, a polypropylene-based wax, or a polybutylene-based wax may be mentioned. As the polyolefin wax, a commercial product may also be used, and in particular, Nopcoat PEM17 (trade name, manufactured by San Nopco Ltd.), Chemipal W4005 (trade name, manufactured by Mitsui Chemicals, Inc.), AQUACER 515 or AQUACER 593 (trade name, manufactured by BYK Japan KK), or Hitec E-6500 (polyethylene wax, manufactured by Toho Chemical Industry Co., Ltd.) may be used.

When the wax is contained, a content thereof with respect to the total mass of the ink jet ink is preferably 0.1 to 5 percent by mass, more preferably 0.2 to 4 percent by mass, and further preferably 0.3 to 3 percent by mass. When the content of the wax is in the range described above, the abrasion resistance is preferably improved, and while the viscosity of the ink is maintained low, the ejection stability and the clogging recovery property preferably tend to be made excellent.

(Other Materials)

The ink jet ink may contain, if needed, various types of additives, such as a chelating agent, an antirust agent, a fungicide, an antioxidant, a reduction inhibitor, and/or an evaporation accelerator.

2.1.4. Preparation and Physical Properties of Ink Jet Ink

The ink jet ink can be obtained in such a manner that the components described above are mixed together in an arbitrary order, and if needed, impurities are then removed by filtration or the like. As a mixing method of the components, a method in which after raw materials are sequentially added in a container equipped with a stirring device, such as a mechanical stirrer or a magnetic stirrer, stirring and mixing are performed is preferably used. As a filtration method, for example, a centrifugal filtration or a filter filtration may be performed, if needed.

In view of the balance between image quality and reliability as an ink jet recording ink, a surface tension (static surface tension) of the ink jet ink at 20° C. is preferably 18 to 40 mN/m, more preferably 20 to 35 mN/m, and further preferably 22 to 33 mN/m. In addition, the measurement of the surface tension can be performed such that using an automatic surface tensiometer CBVP-Z (trade name, manufactured by Kyowa Interface Science Co., Ltd.) or the like, a surface tension when a platinum plate is wetted with an ink in an environment at 20° C. is confirmed.

From the same point as described above, the viscosity of the ink is preferably 3 to 10 mPa·s and more preferably 3 to 8 mPa·s. In addition, the viscosity can be measured in an environment at 20° C. using a viscoelastic tester MCR-300 (trade name, manufactured by Pysica) or the like.

2.2. Recording Method

The recording method is a recording method to perform recording using the treatment liquid and the ink jet ink described above. The recording method includes a treatment liquid adhesion step of adhering the treatment liquid to a recording medium and an ink jet ink adhesion step of ejecting the ink jet ink from an ink jet head so as to be adhered to the recording medium.

2.2.1. Recording Medium

The recording medium may either have or not have a recording surface to absorb an ink. Hence, the recording medium is not particularly limited, and for example, there may be mentioned a liquid absorbing recording medium, such as paper, a film, or a cloth, a liquid low-absorbing recording medium, such as printing paper, or a liquid non-absorbing recording medium, such as a metal, a glass, or a high molecular weight material.

The liquid low-absorbing or the liquid non-absorbing recording medium indicates a recording medium which hardly absorbs an ink or which absorbs no ink at all, respectively. In a quantitative point of view, the liquid non-absorbing or the liquid low-absorbing recording medium indicates "a recording medium having a water absorption amount of 10 mL/m$^2$ or less from a contact start to 30 mseconds$^{1/2}$ measured by Bristow method". This Bristow method is a most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000. On the other hand, the liquid absorbing recording medium indicates a recording medium corresponding to neither the liquid non-absorbing recording medium nor the liquid low-absorbing recording medium. In this specification, the liquid low-absorbing recording medium and the liquid non-absorbing recording medium may be simply called a low-absorbing recording medium and a non-absorbing recording medium, respectively.

As the liquid non-absorbing recording medium, for example, a medium in which a plastic is coated on a substrate such as paper, a medium in which a plastic film is adhered to a substrate such as paper, or a plastic film having no absorbing layer (receiving layer) may be mentioned. As the plastic in this case, for example, there may be mentioned a poly(vinyl chloride), a poly(ethylene terephthalate), a polycarbonate, a polystyrene, a polyurethane, a polyethylene, or a polypropylene.

In addition, as the liquid low-absorbing recording medium, for example, a recording medium in which a liquid low-absorbing coating layer is provided on a substrate surface may be mentioned. For example, so-called coating paper may be mentioned. For example, as coating paper having a substrate made of paper, printing paper, such as art paper, coated paper, or mat paper, may be mentioned, and as coating paper having a substrate made of a plastic film, for example, there may be mentioned paper in which a plastic surface formed, for example, from a poly(vinyl chloride), a poly(ethylene terephthalate), a polycarbonate, a polystyrene, a polyurethane, a polyethylene, or a polypropylene is coated, for example, with a polymer or is coated with particles of silica, titanium, or the like together with a binder.

As the recording medium, a liquid absorbing recording medium may also be used. The liquid absorbing recording medium indicates a "recording medium having a water absorption amount of more than 10 mL/m$^2$ from a contact start to 30 mseconds$^{1/2}$ by the above Bristow method".

As the liquid absorbing recording medium, there may be mentioned a liquid absorbing recording medium formed by providing a receiving layer to absorb a liquid on a substrate surface of a recording medium. For example, ink jet paper (ink jet exclusive paper) may be mentioned. As the receiving layer to absorb a liquid, a layer formed, for example, from a liquid absorbing resin and/or liquid absorbing inorganic particles may be mentioned.

As the liquid absorbing recording medium, a recording medium in which a substrate thereof itself has a liquid absorbing property may also be mentioned. For example, a cloth formed from fibers or paper containing pulp as a component may be mentioned. As the paper, for example, regular paper, cardboard, or linerboard may be mentioned. As the linerboard, for example, a board formed from craft pulp or paper, such as waste paper, may be mentioned.

When the recording method according to this embodiment is applied to a low-absorbing recording medium or a non-absorbing recording medium, an effect to achieve preferable abrasion resistance and image quality of the image formed by the ink jet ink can be more significantly obtained.

2.2.2. Treatment Liquid Adhesion Step

The treatment liquid adhesion step of the recording method according to this embodiment is a step of adhering the treatment liquid described above to a recording medium.

The treatment liquid adhesion step may be performed simultaneously with or before or after the ink adhesion step which will be described below.

As an adhesion method of the treatment liquid, for example, there may be mentioned an immersion coating to immerse a recording medium in the treatment liquid, a roller coating to adhere the treatment liquid using a brush, a roller, a spatula, a roll coater, or the like, a spray coating to spray the treatment liquid using a spray device or the like, or an ink jet coating to adhere the treatment liquid by an ink jet method. Among those mentioned above, an ink jet method is preferable.

In the treatment liquid adhesion step, an adhesion amount of the treatment liquid in a region of the recording medium to which the ink and the treatment liquid are adhered so as to be overlapped with each other with respect to an adhesion amount of the ink jet ink adhered in the ink adhesion step is preferably 5 percent by mass or more, more preferably 7 percent by mass or more, and further preferably 9 percent by mass or more. On the other hand, the adhesion amount of the treatment liquid with respect to the adhesion amount of the ink jet ink adhered in the ink adhesion step is preferably 25 percent by mass or less, more preferably 21 percent by mass or less, further preferably 17 percent by mass or less, and particularly preferably 13 percent by mass or less. When the adhesion amount of the treatment liquid is in the range described above, the image quality and the abrasion resistance preferably tend to be simultaneously obtained.

In addition, the adhesion amount of the treatment liquid in the region of the recording medium to which the ink and the treatment liquid are adhered so as to be overlapped with each other is preferably 0.1 to 5 $mg/inch^2$. In addition, in the region of the recording medium to which the ink and the treatment liquid are adhered so as to be overlapped with each other, an adhesion amount of the treatment liquid in a region in which the adhesion amount of the ink is maximum is also preferably set in the range described above.

2.2.3. Ink Adhesion Step

The ink adhesion step of the recording method according to this embodiment is a step of ejecting the ink jet ink described above by an ink jet method so as to be adhered to the recording medium.

In the ink adhesion step, an adhesion amount of the ink composition per unit area of the recording medium in a region of the recording medium to which the ink is adhered is preferably 3 $mg/inch^2$ or more, more preferably 5 $mg/inch^2$ or more, and further preferably 10 $mg/inch^2$ or more. The adhesion amount of the ink composition per unit area of the recording medium is preferably 20 $mg/inch^2$ or less, more preferably 18 $mg/inch^2$ or less, and further preferably 16 $mg/inch^2$ or less. In the region of the recording medium to which the ink is adhered, an adhesion amount of the ink composition per unit area of the recording medium in a region in which the adhesion amount of the ink composition is maximum, that is, the maximum adhesion amount of the ink, may be preferably set in the range described above.

2.2.4. Serial Type Recording Method

The recording method according to this embodiment is preferably a serial type recording method in which recording is performed by at least two main scannings, and at least two main scannings are performed on the same scanning region. That is, the treatment liquid adhesion step and the ink adhesion step are preferably performed as a serial type recording method.

Figure 2:
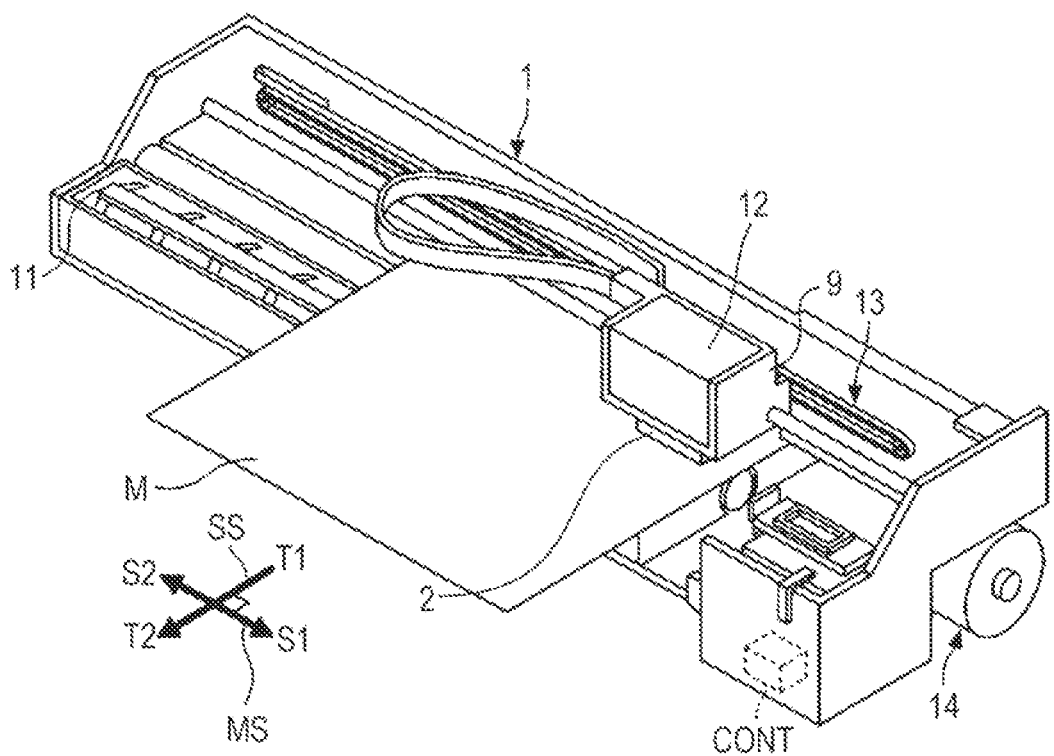
FIG. 2 is a schematic view showing a carriage and its vicinity of one example of the ink jet recording apparatus.

For example, the treatment liquid adhesion step and the ink adhesion step each can be performed as a serial type recording method using an ink jet recording apparatus having a serial type recording head (recording head 2) as shown in FIGS. 1 and 2. In the serial type recording method as described above, the treatment liquid adhesion step and the ink adhesion step are performed in a manner such that while a relative position between the recording head 2 and a recording medium M is changed in a main scanning direction MS, at least two main scannings to adhere the ink composition and the treatment liquid on the same scanning region of the recording medium M are performed, and at least two sub-scannings to change a relative position between a carriage 9 and the recording medium M in a sub-scanning direction SS intersecting the main scanning direction MS are performed. The number of main scannings is preferably 2 to 20, more preferably 3 to 15, and further preferably 4 to 10.

In the case described above, it is preferable that in a nozzle surface (not shown) of the recording head 2, a plurality of nozzle lines in which nozzles are arranged in the sub-scanning direction SS is provided along the main scanning direction MS, the nozzle lines are arranged so that at least parts thereof are overlapped with each other when being projected along the main scanning direction MS, and the nozzle lines are each configured to eject one of the treatment liquid and the ink composition. Accordingly, the treatment liquid and the ink composition are likely to be ejected to and adhered on the same position of the recording medium in the sub-scanning direction by the same main scanning.

In the recording method according to this embodiment, when the recording is performed by at least two main scannings, and at least two main scannings are performed on the same scanning region, an ink droplet amount adhered by one main scanning is decreased. In the case as described above, since the ink droplets are sparsely adhered to the recording medium, ink droplets adjacent to each other are not likely to be brought into contact with each other. As a result, since the ink is not uniformly applied on the recording medium, banding irregularity is more liable to occur, that is, stripe-shaped irregularity is observed in a recorded image. That is, in the serial type recording method, the banding irregularity is disadvantageously liable to occur. However, according to the recording method of this embodiment, since the treatment liquid described above is used, even when the serial type recording method as described above is used, the banding irregularity can be preferably reduced, and in addition, the storage stability of the treatment liquid tends to be made excellent.

In addition, the case in which "at least two main scannings are performed on the same main scanning region" indicates that a scanning is again performed on the region on which the scanning is performed once. For example, when a distance of one sub-scanning is shorter that a length of the nozzle line to eject the ink in the sub-scanning direction, the scanning is again performed on the scanning region on which the scanning is performed once. For example, when the distance of one sub-scanning is one fourth of the length of the nozzle line to eject the ink in the sub-scanning direction, the main scanning is to be performed 4 times on the same scanning region. In the case described above, it is said that the number of main scannings is four.

In addition, the recording method according to this embodiment may be performed by a line type recording method which performs recording by one scanning using a line head. That is, even when the line type recording method is used, the effects of the treatment liquid, the ink set, and the recording method of this embodiment can be sufficiently obtained. In the case described above, although the stripe-shaped irregularity may also be generated in the scanning direction in some cases, the irregularity described above can be reduced by this embodiment.

2.2.5. Primary Heating Step

The recording method according to this embodiment may also include a primary heating step of heating the ink jet ink adhered to the recording medium.

The primary heating step is a step of drying the ink adhered to the recording medium by heating at an early stage. The primary heating step is a heating step of drying at least a part of a solvent component of the ink adhered to the recording medium so as to at least decrease the fluidity the ink. The primary heating step may be performed such that the ink is adhered to a heated recording medium or such that the ink is heated at an early stage after the adhesion thereof. The primary heating step is preferably started within at most 0.5 seconds from the landing of an ink droplet on the recording medium. In addition, the primary heating step may also be performed on the treatment liquid adhered as is the case of the ink described above.

The primary heating step is preferably performed by an IR heater, radiation of microwaves, a platen heater, or ventilation of hot wind to the recording medium by a fan.

The heating of the primary heating step may be performed before the treatment liquid adhesion step and the ink adhesion step described above, simultaneously with the adhesion steps described above, or at an early stage after the above adhesion steps and is preferably performed simultaneously with the adhesion steps described above. By the heating order as described above, the treatment liquid adhesion step and the ink adhesion step can be performed.

When the ink is adhered to a heated recording medium, a heating temperature in the primary heating step is a surface temperature of the recording medium when the ink is adhered, and when the heating is performed at an early stage after the adhesion of the ink, the heating temperature in the primary heating step is a surface temperature of the recording medium when the heating is performed. In addition, the surface temperature of the recording medium indicates the maximum temperature during the heating by the primary heating step.

The heating temperature in the primary heating step is, as the surface temperature of the recording surface of the heated recording medium, preferably 28° C. or more, more preferably 30° C. or more, further preferably 32° C. or more, and particularly preferably 34° C. or more. In addition, the heating temperature in the primary heating step is, as the surface temperature of the recording surface of the heated recording medium, preferably 50° C. or less, more preferably 45° C. or less, and further preferably 40° C. or less. When the heating temperature in the primary heating step is in the range described above, the banding irregularity can be preferably reduced, and in addition, preferably image quality (in terms of aggregation irregularity) and clogging recovery property are likely to be obtained.

2.2.6. Post Heating Step

The recording method according to this embodiment may also include, after the treatment liquid adhesion step and the ink adhesion step described above, a post heating step of heating the recording medium.

The post heating step is a heating step of performing a sufficient heating so as to complete the recording and so as to enable a recorded matter to be used. The post heating step is a heating step of planarizing an ink coating film by sufficiently drying the solvent components of the ink and the treatment liquid and by heating the resin or the like contained in the ink. The post heating step is preferably started more than 0.5 seconds after the ink and the treatment liquid are adhered to the recording medium. For example, the heating is preferably started on a certain recording region of the recording medium more than 0.5 seconds after the adhesion of the treatment liquid and the ink is completed to the certain recording region described above. In addition, a preferable temperature in the above primary heating step is preferably different from a preferable temperature of the post heating step.

For example, when an ink jet recording apparatus is used, the heating of the recording medium in the post heating step can be performed using an appropriate heating device. In addition, besides the heating device provided in the ink jet recording apparatus, the heating may also be performed using an appropriate heating device. In addition, a surface temperature of the recording medium in this case is preferably 60° C. or more, more preferably 70° C. or more, further preferably 80° C. or more, and particularly preferably 85° C. or more. In addition, the surface temperature of the recording medium heated in the post heating step is preferably 120° C. or less, more preferably 110° C. or less, further preferably 100° C. or less, and particularly preferably 95° C. or less. According to the recording method of this embodiment, even when the surface temperature of the recording medium is in the range described above, the ink can be sufficiently dried, and a recorded matter having an excellent abrasion resistance tends to be obtained.

2.3. Ink Jet Recording Apparatus

One example of an ink jet recording apparatus which can be preferably used to carry out the individual steps of the recording method according to this embodiment will be describe with reference to the drawings.

<Schematic Apparatus Structure>

FIG. 1 is a schematic cross-sectional view showing an ink jet recording apparatus 1. FIG. 2 is a perspective view showing one example of the structure of a carriage and its vicinity of the ink jet recording apparatus 1 shown in FIG. 1. As shown in FIGS. 1 and 2, the ink jet recording apparatus 1 includes a recording head 2, an IR heater 3, a platen heater 4, a heating heater 5, a cooling fan 6, a pre-heater 7, a ventilation fan 8, a carriage 9, a platen 11, a carriage transfer mechanism 13, a transport device 14, and a control portion CONT. In the ink jet recording apparatus 1, all operations thereof are controlled by the control portion CONT shown in FIG. 2.

<Structure of Recording Head>

The recording head 2 has a structure to perform recording on the recording medium M by ejecting the ink jet ink from a nozzle of the recording head 2 so as to be adhered thereto. The treatment liquid can also be adhered as described above. The recording head 2 shown in FIGS. 1 and 2 is a serial type recording head and is configured to adhere the ink and the treatment liquid to the recording medium M by at least two scannings performed in a main scanning direction relative to the recording medium M. The recording head 2 is mounted on the carriage 9 shown in FIG. 2. The recording head 2 is scanned at least two times in the main scanning direction relative to the recording medium M by the operation of the carriage transfer mechanism 13 to transfer the carriage 9 in a medium width direction of the recording medium M. The medium width direction is the main scanning direction of the recording head 2. The scanning in the main scanning direction is also called a main scanning.

In addition, the main scanning direction is a direction in which the carriage 9 mounting the recording head 2 is transferred. In FIG. 1, the main scanning direction is a direction intersecting a sub-scanning direction which is a transport direction of the recording medium M shown by an arrow SS. In FIG. 2, the width direction of the recording medium M, that is, a direction represented by S1-S2, is the main scanning direction MS, and a direction represented by T1-T2 is the sub-scanning direction SS. In addition, by one scanning, the scanning is performed in the main scanning direction, that is, in one direction represented by an arrow S1 or an arrow S2. In addition, since the main scanning of the recording head 2 and the sub-scanning which is the transport of the recording medium M are each repeatedly performed at least two times, the recording is performed on the recording medium M.

A cartridge 12 to supply the ink and the treatment liquid to the recording head 2 includes a plurality of independent cartridges. The cartridge 12 is detachably fitted to the carriage 9 mounting the recording head 2. In the respective cartridges, different types of ink jet inks and different types of treatment liquids are filled, and the ink jet inks and the treatment liquids are supplied to respective nozzles from the cartridge 12. In addition, although an example in which the cartridge 12 is fitted to the carriage 9 is shown in FIGS. 1 and 2, the cartridge 12 is not limited thereto and may be provided at a position other than that of the carriage 9 so that the ink jet inks and the treatment liquids are each supplied to the nozzle by a supply tube not shown.

The ejection by the recording head 2 may use a known method in the past. In this embodiment, a method in which liquid droplets are ejected using vibration of a piezoelectric element, that is, an ejection method in which for example, ink droplets are formed by mechanical deformation of an electrostrictive element, is used.

<Primary Heating Mechanism>

In order to heat the recording medium M when the ink and the treatment liquid are ejected from the recording head 2 and then adhered to the recording medium, the ink jet recording apparatus 1 may include a primary heating mechanism. The primary heating mechanism may use a conduction method, a ventilation method, a radiation method, or the like. The conduction method is a method to conduct heat to the recording medium from a member in contact therewith. For example, the platen heater 4 may be mentioned. The ventilation method is a method to dry the ink or the like by sending an ordinary temperature wind or a hot wind to the recording medium. For example, a ventilation fan may be mentioned. The radiation method is a method to heat the recording medium by emitting radioactive rays which generates heat to the recording medium. For example, IR radiation may be mentioned. In addition, although not shown in the drawing, a heater similar to the platen heater may be provided right downstream of the platen heater 4 in the SS direction. Those primary heating mechanisms may be used alone, or at least two types thereof may be used in combination. For example, as the primary heating mechanism, the IR heater 3 and the platen heater 4 are provided.

In addition, when the IR heater 3 is used, the recording medium M can be heated using a radiation method to radiate infrared rays from a recording head 2 side. Accordingly, although the recording head 2 is also liable to be simultaneously heated, compared to the case in which heating is performed from a rear surface of the recording medium M by the platen heater 4 or the like, the temperature can be increased without receiving the influence of the thickness of the recording medium M. In addition, there may also be provided various types of fans (such as the ventilation fan 8) to dry the ink or the like on the recording medium M by supplying a hot wind or a wind having the same temperature as that in the environment to the recording medium M.

The platen heater 4 is able to heat the recording medium M at a position facing the recording head 2 with the platen 11 interposed therebetween. The platen heater 4 is able to heat the recording medium M by a conduction method, and in the ink jet recording method, the platen heater 4 is used, if needed.

In addition, the ink jet recording apparatus 1 may include the pre-heater 7 to heat the recording medium M in advance before the ink or the treatment liquid is adhered to the recording medium M.

<Post Heating Mechanism>

A post heating mechanism to dry and fix the ink or the like by heating the recording medium after the treatment liquid adhesion step and the ink adhesion step may be included.

The heating heater 5 used for the post heating mechanism is a heater to dry and fix the ink or the like adhered to the recording medium M. Since the heating heater 5 heats the recording medium M on which an image is recorded, for example, moisture contained in the ink or the treatment liquid is more rapidly evaporated and scattered, and an ink film is formed from the resin contained in the ink. As described above, since the ink film is tightly fixed or adhered onto the recording medium M, a film forming property is made excellent, and an excellent high quality image can be obtained in a short time.

<Other Structures>

The ink jet recording apparatus 1 may include the cooling fan 6. After the ink or the like recorded to the recording medium M is dried, since the ink on the recording medium M is cooled by the cooling fan 6, the ink coating film can be formed with good adhesion on the recording medium M.

Under the carriage 9, the platen 11 to support the recording medium M, the carriage transfer mechanism 13 to transfer the carriage 9 relative to the recording medium M, and the transport device 14 which is a roller to transport the recording medium M in the sub-scanning direction are provided. The operations of the carriage transfer mechanism 13 and the transport device 14 are controlled by the control portion CONT.

<Electric Control>

Figure 3:
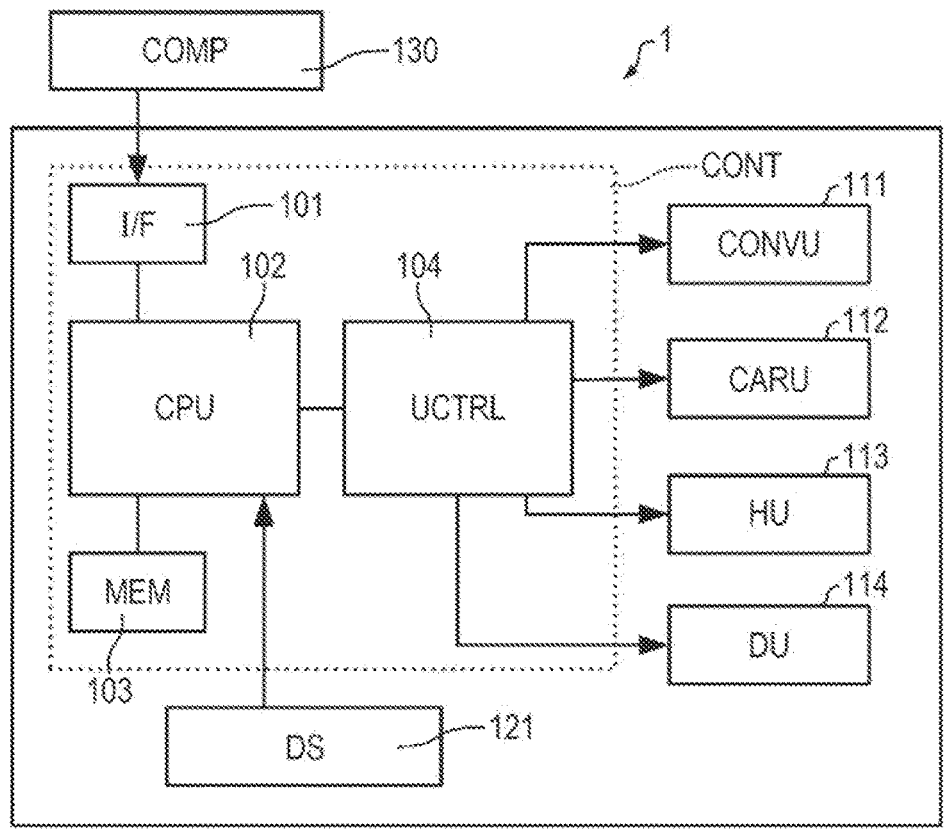
FIG. 3 is a block diagram of one example of the ink jet recording apparatus.

FIG. 3 is a functional block diagram of the ink jet recording apparatus 1. The control portion CONT is a control unit to control the ink jet recording apparatus 1. An interface portion 101 (I/F) functions to send and receive data between a computer 130 (COMP) and the ink jet recording apparatus 1. A CPU 102 is an arithmetic processing device to control the entire ink jet recording apparatus 1. A memory 103 (MEM) is to secure, for example, a region in which a program of the CPU 102 is stored and an operation region thereof. The CPU 102 controls individual units by a unit control circuit 104 (UCTRL). In addition, the status in the ink jet recording apparatus 1 is monitored by a detector group 121 (DS), and based on the detection result thereof, the control portion CONT controls the individual units.

A conveyer unit 111 (CONVU) is a unit to control the sub-scanning (transport) of the ink jet recording and, in particular, is a unit to control a transport direction and a transport rate of the recording medium M.

Furthermore, in more particular, by controlling a rotation direction and a rotation rate of a transport roller driven by a motor, the transport direction and the transport rate of the recording medium M are controlled.

A carriage unit 112 (CARU) is a unit to control the main scanning (pass) of the ink jet recording and, in particular, is a unit to reciprocally transfer the recording head 2 in the main scanning direction. The carriage unit 112 includes the carriage 9 mounting the recording head 2 and the carriage transfer mechanism 13 to reciprocally transfer the carriage 9.

A head unit 113 (HU) is a unit to control ejection amounts of the ink and the treatment liquid from the nozzles of the recording head 2. For example, when the nozzle of the recording head 2 is driven by a piezoelectric element, the operation of the piezoelectric element of each nozzle is controlled. By the head unit 113, for example, an adhesion timing of each of the inks and the treatment liquids and a dot size thereof are controlled. In addition, by combination of the controls by the carriage unit 112 and the head unit 113, an adhesion amount of the ink or the treatment liquid per one scanning is controlled.

A drying unit 114 (DU) controls the temperatures of various types of heaters, such as the IR heater 3, the pre-heater 7, the platen heater 4, and the heating heater 5.

In the ink jet recording apparatus 1 described above, an operation to transfer the carriage 9 mounting the recording head 2 in the main scanning direction and a transport operation (sub-scanning) are alternately and repeatedly performed. In the case described above, when each pass is performed, the control portion CONT controls the carriage unit 112 such that the recording head 2 is transferred in the main scanning direction and also controls the head unit 113 such that liquid droplets of the ink and the treatment liquid are ejected from predetermined nozzle holes of the recording head 2, so that the liquid droplets of the ink and the treatment liquid are adhered to the recording medium M. In addition, the control portion CONT controls the conveyer unit 111 such that when the transport operation is performed, the recording medium M is transported by a predetermined transport amount (feed amount) in the transport direction.

In the ink jet recording apparatus 1, since the main scanning (pass) and the sub-scanning (transport operation) are repeatedly performed, a recording region to which a plurality of liquid droplets is adhered is gradually transported. In addition, by the heating heater 5, the liquid droplets adhered to the recording medium M are dried, so that an image is completed. Subsequently, the recorded matter thus completed may be wound in the form of a roller by a winding mechanism or may be transported by a flat bed mechanism.

In the recording apparatus used for the recording method, a member in contact with the treatment liquid may contain a lubricant. As the lubricant, for example, an aliphatic acid-based lubricant, a hydrocarbon-based lubricant, or a higher alcohol-based lubricant may be mentioned.

As the aliphatic acid-based lubricant, for example, an aliphatic acid, an aliphatic acid salt, or an aliphatic acid derivative may be mentioned. As the aliphatic acid derivative, for example, an aliphatic acid amide or an aliphatic acid ester may be mentioned.

As the member of the recording apparatus in contact with the treatment liquid, for example, there may be mentioned members forming a pack film of an ink pack in which the treatment liquid is received, an inside surface of the cartridge, an ink supply tube, and a flow path in the ink jet head through which the treatment liquid flows. Those members (materials forming the members) contain a lubricant. When the lubricant is contained, since lubricity can be imparted to the member, the strength, the abrasion resistance, or the like of the member are preferably improved, and a mold release property is preferably made excellent when the member is molded.

On the other hand, when the lubricant is contained, foreign materials may be generated in the treatment liquid due to the lubricant in some cases. Even in the case as described above, when the treatment liquid according to this embodiment is used, the foreign materials are not likely to be generated, and a foreign material suppressing effect can be made more significant.

Figure 4:
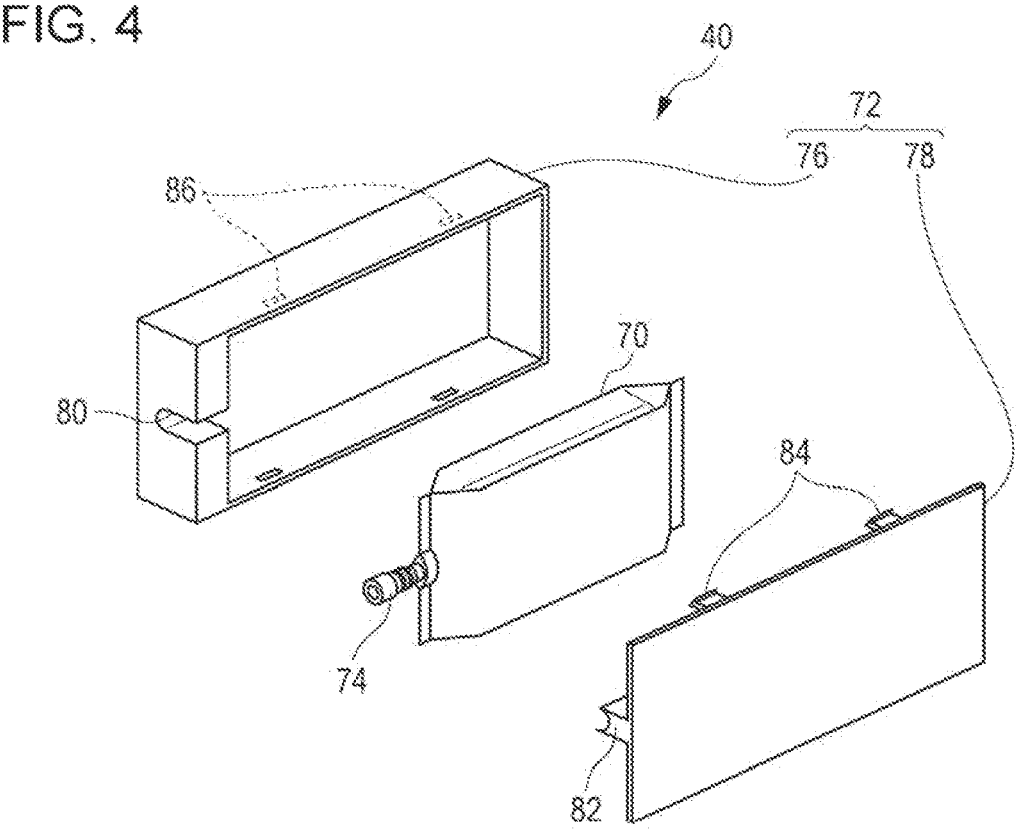
FIG. 4 is a schematic view of one example of a container to receive a treatment liquid.

FIG. 4 shows a cartridge which is one example of a container in which the treatment liquid is received. An ink pack 70 receives the treatment liquid. The ink pack 70 forms a cartridge 40 together with a cartridge case 72. The cartridge case 72 includes a main body case 76 to receive the ink pack 70 for protection and a lid portion 78. The ink pack 70 has an ink inlet port 74, and the cartridge case 72 includes hook portions 84, a notched portion 80, and a holding portion 82. The ink pack 70 is formed from a pack film. The pack film is formed, for example, from a plastic, such as a polyolefin, a nylon, or another plastic. When the pack film contains the lubricant described above, during the storage of the treatment liquid received in the ink pack, foreign materials may be generated in the treatment liquid in some cases. Even in the case as described above, when the treatment liquid according to this embodiment is used, the generation of foreign materials can be preferably suppressed.

3. Examples and Comparative Examples

Hereinafter, although the present disclosure will be described in more detail with reference to Examples, the present disclosure is not limited thereto. Hereinafter, unless otherwise particularly described, "part(s)" and "%" are each represented on a mass basis. In addition, unless otherwise particularly described, the evaluation was performed in an environment at a temperature of 25.0° C. and a relative humidity of 40.0%.

3.1. Preparation of Treatment Liquid

After individual components were charged to have the compositions shown in Tables 1 to 3, mixing and stirring were performed for 2 hours by a magnetic stirrer, and filtration was performed on each composition using a membrane filter having a pore diameter of 5 μm, so that treatment liquids A to V used in Examples and Comparative Examples were obtained. In addition, the numerical value of the resin in the table indicates a solid content.

|  |  | TREATMENT LIQUID A | TREATMENT LIQUID B | TREATMENT LIQUID C | TREATMENT LIQUID D | TREATMENT LIQUID G | TREATMENT LIQUID I | TREATMENT LIQUID L | TREATMENT LIQUID M |
|---|---|---|---|---|---|---|---|---|---|
| WATER-SOLUBLE LOW MOLECULAR WEIGHT COMPOUND | ALKANEDIOL | PG (BOILING POINT: 188° C.) | 20.0 | 20.0 | 20.0 | 20.0 | 20.0 | 20.0 | 20.0 | 20.0 |
|  |  | 1,2HD (BOILING POINT: 224° C.) | 2.0 | 2.0 | 2.0 | 2.0 | 2.0 | 2.0 | 2.0 | 2.0 |
|  | AMIDE | CPL (BOILING POINT: 267° C.) | 2.0 | — | — | 2.0 | 2.0 | — | 2.0 | 2.0 |
| ORGANIC ACID OR ORGANIC AMINE | DICARBOXYLIC ACID | ADIPIC ACID | 0.001 | 0.001 | — | 0.001 | — | 0.01 | — | — |
|  |  | MALONIC ACID | — | — | — | — | — | — | — | — |
|  | HYDROXY ACID | CITRIC ACID | — | — | 0.001 | — | 0.001 | — | 0.001 | — |
|  | ALKANOL AMINE | TIRA | — | — | — | — | — | — | — | 0.01 |
| POLYVALENT METAL SALT | ORGANIC METAL SALT | CALCIUM FORMATE | 3.0 | 3.0 | 3.0 | 3.0 | 3.0 | 3.0 | 3.0 | 3.0 |
|  |  | CALCIUM LACTATE PENTAHYDRATE | — | — | — | — | — | — | — | — |
|  |  | CALCIUM ACETATE MONOHYDRATE | — | — | — | — | — | — | — | — |
|  |  | CALCIUM PROPIONATE | — | — | — | — | — | — | — | — |
|  | INORGANIC METAL SALT | MAGNESIUM SULFATE HEPTAHYDRATE | — | — | — | — | — | — | — | — |
|  |  | CALCIUM NITRATE | — | — | — | — | — | — | — | — |
| ACRYLIC ACID-BASED RESIN OR MALEIC ACID-BASED RESIN | MALEIC ACID BASE/NON-REACTIVE | DISPERBYK-190 | 0.2 | — | — | — | 0.7 | 0.2 | 0.2 | 0.2 |
|  | ACRYLIC ACID BASE/NON-REACTIVE | DISPERBYK-2010 | — | 0.2 | — | — | — | — | — | — |
|  |  | SN DISPERSANT 5033 | — | — | 0.2 | — | — | — | — | — |
|  | MALEIC ACID BASE/REACTIVE | SN DISPERSANT 5029 | — | — | — | 0.2 | — | — | — | — |
| ANOTHER RESIN | ACRYLIC NONIONIC/NON-REACTIVE | PITZOOL K-17 | — | — | — | — | — | — | — | — |
| SURFACTANT | SILICONE BASE | BYK-349 | 0.5 | 0.5 | 0.5 | 0.5 | 0.5 | 0.5 | 0.5 | 0.5 |
|  | ACETYLENE BASE | SURFYNOL DF110D | 0.1 | 0.1 | 0.1 | 0.1 | 0.1 | 0.1 | 0.1 | 0.1 |
|  | PURE WATER |  | BALANCE | BALANCE | BALANCE | BALANCE | BALANCE | BALANCE | BALANCE | BALANCE |
|  | TOTAL |  | 100 | 100 | 100 | 100 | 100 | 100 | 100 | 100 |
|  | pH |  | 6.6 | 6.7 | 6.7 | 6.7 | 6.7 | 5.7 | 6.5 | 6.5 |
| EVALUATION | STORAGE STABILITY |  | A | B | A | B | B | B | A | A |

| | | TREATMENT LIQUID N | TREATMENT LIQUID O | TREATMENT LIQUID P | TREATMENT LIQUID Q | TREATMENT LIQUID R | TREATMENT LIQUID S | TREATMENT LIQUID U | TREATMENT LIQUID E |
|---|---|---|---|---|---|---|---|---|---|
| WATER-SOLUBLE LOW MOLECULAR WEIGHT COMPOUND | ALKANEDIOL | PG (BOILING POINT: 188° C.) | 20.0 | 20.0 | 20.0 | 20.0 | 20.0 | 20.0 | 20.0 | 20.0 |
| | AMIDE | 1,2HD (BOILING POINT: 224° C.) | 2.0 | 2.0 | 2.0 | 2.0 | 2.0 | 2.0 | 2.0 | 2.0 |
| | | CPL (BOILING POINT: 267° C.) | 2.0 | 2.0 | 2.0 | 2.0 | 2.0 | 2.0 | 2.0 | 2.0 |
| ORGANIC ACID OR ORGANIC AMINE | DICARBOXYLIC ACID | ADIPIC ACID | 0.01 | 0.005 | 0.005 | 0.05 | 0.001 | 0.002 | — | 0.001 |
| | | MALONIC ACID | — | — | — | — | — | — | — | — |
| | HYDROXY ACID | CITRIC ACID | — | — | — | — | — | — | — | — |
| | ALKANOLAMINE | TIPA | — | — | — | — | — | — | 0.05 | — |
| POLYVALENT METAL SALT | ORGANIC METAL SALT | CALCIUM FORMATE | 4.0 | 1.5 | — | — | — | — | — | 3.0 |
| | | CALCIUM LACTATE PENTAHYDRATE | — | 2.0 | — | — | — | — | — | — |
| | | CALCIUM ACETATE MONOHYDRATE | — | — | 4.0 | — | — | — | — | — |
| | | CALCIUM PROPIONATE | — | — | — | 5.0 | — | — | — | — |
| | INORGANIC METAL SALT | MAGNESIUM SULFATE HEPTAHYDRATE | — | — | — | — | 7.0 | 6.0 | — | — |
| | | CALCIUM NITRATE | — | — | — | — | — | — | 6.0 | — |
| ACRYLIC ACID-BASED RESIN OR MALEIC ACID-BASED RESIN | MALEIC ACID BASE/NON-REACTIVE | DISPERBYK-190 | 0.2 | 0.2 | 0.2 | 0.2 | 0.2 | 0.2 | 0.2 | — |
| | ACRYLIC ACID BASE/NON-REACTIVE | DISPERBYK-2010 | — | — | — | — | — | — | — | — |
| | | SN DISPERSANT 5033 | — | — | — | — | — | — | — | — |
| | MALEIC ACID BASE/REACTIVE | SN DISPERSANT 5029 | — | — | — | — | — | — | — | — |
| ANOTHER RESIN | NONIONIC/NON-REACTIVE | PITZCOL K-17 | — | — | — | — | — | — | — | 0.2 |
| SURFACTANT | SILICONE BASE | BYK-349 | 0.5 | 0.5 | 0.6 | 0.6 | 0.5 | 0.5 | 0.5 | 0.5 |
| | ACETYLENE BASE | SURFYNOL DF110D | 0.1 | 0.1 | 0.1 | 0.1 | 0.1 | 0.1 | 0.1 | 0.1 |
| | PURE WATER | | BALANCE | BALANCE | BALANCE | BALANCE | BALANCE | BALANCE | BALANCE | BALANCE |
| | TOTAL | | 100 | 100 | 100 | 100 | 100 | 100 | 100 | 100 |
| | pH | | 6.5 | 6.6 | 6.8 | 6.7 | 5.9 | 6.6 | 7.4 | 6.7 |
| EVALUATION | STORAGE STABILITY | | A | A | B | B | A | B | B | C |

| | | TREATMENT LIQUID F | TREATMENT LIQUID H | TREATMENT LIQUID J | TREATMENT LIQUID K | TREATMENT LIQUID T | TREATMENT LIQUID V |
|---|---|---|---|---|---|---|---|
| WATER SOLUBLE LOW MOLECULAR WEIGHT COMPOUND | ALKANEDIOL | PG (BOILING POINT: 188° C.) | 20.0 | 20.0 | 20.0 | 20.0 | 20.0 | 20.0 |
| | | 1,2HD (BOILING POINT: 224° C.) | 2.0 | 2.0 | 2.0 | 2.0 | 2.0 | 2.0 |
| | AMIDE | CPL (BOILING POINT: 267° C.) | 2.0 | 2.0 | 2.0 | — | — | 2.0 |
| ORGANIC ACID OR ORGANIC AMINE | DICARBOXYLIC ACID | ADIPIC ACID | 0.001 | 0.001 | 0.05 | — | 0.001 | — |
| | | MALONIC ACID | — | — | — | — | — | — |
| | HYDROXY ACID | CITRIC ACID | — | — | — | — | — | — |
| | ALKANOLAMINE | TIPA | — | — | — | — | — | 0.1 |
| POLYVALENT METAL SALT | ORGANIC METAL SALT | CALCIUM FORMATE | 3.0 | 3.0 | 3.0 | — | — | — |
| | | CALCIUM LACTATE PENTAHYDRATE | — | — | — | — | — | — |
| | | CALCIUM ACETATE MONOHYDRATE | — | — | — | — | — | — |
| | | CALCIUM PROPIONATE | — | — | — | — | — | — |
| | INORGANIC METAL SALT | MAGNESIUM SULFATE HEPTAHYDRATE | — | — | — | 3.0 | — | 5.0 |
| | | CALCIUM NITRATE | — | — | — | — | — | — |
| ACRYLIC ACID-BASED RESIN OR MALEIC ACID-BASED RESIN | MALEIC ACID BASE/NON-REACTIVE | DISPERBYK-190 | — | 1.2 | — | — | — | — |
| | ACRYLIC ACID BASE/NON-REACTIVE | DISPERBYK-2010 | — | — | 0.2 | 0.2 | 0.2 | 0.2 |
| | MALEIC ACID BASE/REACTIVE | SN DISPERSANT 5033 | — | — | — | — | — | — |
| ANOTHER RESIN | NONIONIC/NON-REACTIVE | SN DISPERSANT 5029 | — | — | — | — | — | — |
| | | PITZCOL K-17 | — | — | — | — | — | — |
| SURFACTANT | SILICONE BASE | BYK-349 | 0.5 | 0.5 | 0.5 | 0.5 | 0.5 | 0.5 |
| | ACETYLENE BASE | SURFYNOL DF1100 | 0.1 | 0.1 | 0.1 | 0.1 | 0.1 | 0.1 |
| | PURE WATER | | BALANCE | BALANCE | BALANCE | BALANCE | BALANCE | BALANCE |
| | TOTAL | | 100 | 100 | 100 | 100 | 100 | 100 |
| | pH | | 6.7 | 6.7 | 5.3 | 7.1 | 5.7 | 7.9 |
| EVALUATION | STORAGE STABILITY | | C | C | C | C | B | C |

The abbreviations and the product names shown in Tables 1 to 3 will be further described.

PG: propylene glycol 1,2-HD: 1,2-hexanediol

CPL: ε-caprolactam

TIPA: triisopropanolamine

DISPERBYK-190: styrene-maleic acid-based water-soluble resin (manufactured by BYK Japan KK) (non-reactive resin)

DISPERBYK-2010: styrene-maleic acid-based resin emulsion (manufactured by BYK Japan KK) (non-reactive resin)

SN Dispersant 5033: acrylic-based water-soluble resin (manufactured by San Nopco Ltd.) (non-reactive resin)

SN Dispersant 5029: styrene-maleic acid-based water-soluble resin (manufactured by San Nopco Ltd.) (reactive resin)

Pitzcol K-17: nonionic water-soluble resin, polypyrrolidone (PVP) (manufactured by DKS Co., Ltd.) (non-reactive resin)

BYK-349: silicone-based surfactant (manufactured by BYK Japan KK)

Surfynol DF110D: acetylene-based surfactant (manufactured by Nisshin Chemical Industry Co., Ltd.)

In addition, the "non-reactive resin" represents a resin not to react with a calcium formate aqueous solution, and the "reactive resin" represents a resin to react with a calcium formate aqueous solution. A judgment method therefor is as described below.

A resin was charged in a sample bottle so that a resin solid content was 0.1 g. After water was added therein so that a total amount was 8 g, 0.5 g of calcium formate aqueous solution at a concentration of 3 percent by mass was added and stirred, and the state of the mixture thus formed was confirmed by visual inspection (evaluation in an environment at 25° C.). In addition, when precipitates were generated, the resin was regarded as "reactive", and when no precipitates were generated, the resin was regarded as "non-reactive".

3.2. Preparation of Ink Jet Ink

After individual components were charged in a container so as to have the compositions shown in Table 4, stirring and mixing were performed for 2 hours using a magnetic stirrer, and a dispersing treatment was further performed by a bead mill filled with zirconia beads having a diameter of 0.3 mm, so that a sufficient mixing was performed. After the stirring was performed for 1 hour, filtration was performed on each composition using a 5.0-μm PTFE-made membrane filter, so that ink jet inks (A and B) were obtained. Pure water was used as water and was added so that the mass of each ink was 100 percent by mass. A pigment and a dispersant resin were used to prepare a dispersion liquid as described below, and the dispersion liquid thus prepared was used.

First of all, 50 g of methyl ethyl ketone (MEK) was added in a flask equipped with a dripping funnel, a nitrogen-inlet tube, a reflux condenser, a thermometer, and a stirring device and was then heated to 75° C. with nitrogen bubbling. In addition, a mixture of monomers including 80 g of butyl methacrylate, 50 g of methyl methacrylate, 15 g of styrene, and 20 g of methacrylic acid; 50 g of MEK; and 500 mg of a polymerization initiator (azobisisobutyronitrile/AIBN) was dripped in the flask described above over 3 hours using the dripping funnel. After the dripping was completed, heating reflux was performed for 6 hours, and MEK in an amount corresponding to that lost by evaporation was added after spontaneous cooling, so that a resin solution (resin solid content: 50 percent by mass, acid value: 79 mg/KOH, Tg: 65° C.) was obtained. To 20 g of this solution thus obtained, a predetermined amount of a sodium hydroxide aqueous solution at a concentration of 20 percent by mass was added so as to neutralize 100% of a salt forming group. Subsequently, to the solution thus neutralized, 50 g of a pigment (C.I. Pigment Blue 15:3) was gradually added with stirring, and kneading was then performed for 2 hours by a bead mill. After 200 g of ion exchange water was added to the kneaded material thus obtained, MEK was distilled off under reduced pressure by heating. Furthermore, the concentration was adjusted with ion exchange water, so that a pigment dispersion (pigment solid content: 20 percent by mass, resin solid content: 5 percent by mass) was obtained.

TABLE 4

|  |  |  | INK A | INK B |
|---|---|---|---|---|
| WATER-SOLUBLE LOW MOLECULAR WEIGHT COMPOUND | ALKANEDIOL | PG (BOILING POINT: 188° C.) | 10.0 | 10.0 |
|  |  | 1,2HD (BOILING POINT: 224° C.) | 2.0 | 2.0 |
|  | AMIDE | CPL (BOILING POINT: 267° C.) | 2.0 | 2.0 |
|  | ALKANOLAMINE | TIPA (BOILING POINT: 301° C.) | 0.1 | 1.0 |
| PIGMENT DISPERSION LIQUID |  | CYAN PIGMENT | 10.0 | 10.0 |
| WATER DISPERSION RESIN | ACRYLIC BASE | JONCRYL 631 | 6.0 | 6.0 |
|  | POLYOLEFIN BASE | HITEC E-6500 | 0.5 | 0.5 |
| SURFACTANT | SILICONE BASE | BYK-349 | 0.5 | 0.5 |
|  | ACETYLENE BASE | SURFYNOL DF110D | 0.1 | 0.1 |
|  |  | PURE WATER | BALANCE | BALANCE |
|  |  | TOTAL | 100 | 100 |
|  |  | pH | 8.0 | 9.2 |

The abbreviations and the product names in Table 4 will be further described.

Joncryl 631: styrene-acrylic-based resin emulsion (manufactured by BASF Japan Ltd.)

Hitec E-6500: polyethylene-based wax emulsion (manufactured by Toho Chemical Industry Co., Ltd.)

The other materials are similar to those shown in Tables 1 to 3. The cyan pigment in the table represents a pigment solid content.

3.3. Evaluation Method 3.3.1. Print Test

A print test was performed under the following conditions.

Printing machine: SC-R5050 (manufactured by Seiko Epson Corporation) modified machine Resolution: 1,200×1,200 dpi
Print pattern: solid pattern (cyan)
Number of scannings: 9 times, simultaneous adhesion of treatment liquid and ink
Paper surface temperature at platen portion: 35° C.
Secondary drying temperature: 80° C.
recording medium Orajet 3165G-010(manufactured by Orafol Japan, vinyl chloride film)
platen gap: 1.7 mm 3.3.2. Evaluation of Storage Stability First, 50 g of each treatment liquid was sealed in an aluminum bag (three-layer laminate bag of nylon/aluminum/polyethylene, a polyethylene was located inside, and stearic amide was used as a lubricant) so as not to incorporate bubbles therein and was then left in a temperature-constant bath at 60° C. for 5 days and 14 days. After the bag was recovered and spontaneously cooled, 10 g of the treatment liquid was allowed to flow through a filter (liquid flow area: 1 cm$^2$) having a pore diameter of 10 μm, and the number of foreign materials was counted. The evaluation was performed by the following criteria, and the results are shown in Tables 1 to 3.

A: number of foreign materials at 60° C. is less than 50 for 14 days.
B: number of foreign materials at 60° C. is 50 or more for 14 days and less than 50 for 5 days.
C: number of foreign materials at 60° C. is 50 or more for 5 days.

3.3.3. Evaluation of Abrasion Resistance

Each set of the treatment liquid and the ink jet ink shown in Table 5 was filled in SC-R5050 (ink jet printer, manufactured by Seiko Epson Corporation), and on a recording medium, a solid pattern (color ink adhesion amount: 12 mg/inch$^2$, treatment liquid adhesion amount: 1 mg/inch$^2$) was printed. After the printed matter thus obtained was left at room temperature for 30 minutes, an ink-adhesion portion thereof was cut into a rectangular shape having a size of 30×150 mm and was then rubbed 100 times using a plain woven cloth wetted with water by a Gakushin-type rubbing test machine (load: 500 g). Subsequently, the degree of ink peeling was evaluated by visual inspection. The evaluation was performed by the following criteria, and the results are shown in Table 5.

AA: no peeling is observed.
A: less than 20% of evaluation area is peeled off.
B: less than 50% of evaluation area is peeled off.
C: 50% or more of evaluation area is peeled off.

3.3.4. Evaluation of Solid Image Quality

Each set of the treatment liquid and the ink jet ink shown in Table 5 was filled in SC-R5050 (ink jet printer, manufactured by Seiko Epson Corporation), and on a recording medium, a solid pattern (color ink adhesion amount: 12 mg/inch$^2$, treatment liquid adhesion amount: 1 mg/inch$^2$) was printed and then observed by visual inspection. The evaluation was performed by the following criteria, and the results are shown in Table 5.

AA: No stripe-shaped density irregularity (banding irregularity) extended in main scanning direction is observed.
A: Although banding irregularity is slightly observed, difference in density is small and inconspicuous.
B: Banding irregularity is observed, and difference in density is large but is acceptable.
C: Banding irregularity is observed, and difference in density is large and conspicuous.

|  |  | EXAMPLE 1 | EXAMPLE 2 | EXAMPLE 3 | EXAMPLE 4 | EXAMPLE 5 | EXAMPLE 6 |
|---|---|---|---|---|---|---|---|
| INK SET | TREATMENT LIQUID | TREATMENT LIQUID A | TREATMENT LIQUID B | TREATMENT LIQUID C | TREATMENT LIQUID D | TREATMENT LIQUID G | TREATMENT LIQUID I |
|  | COLOR INK | INK A | INK A | INK A | INK A | INK A | INK A |
|  | DIFFERENCE IN pH | 1.4 | 1.3 | 1.3 | 1.3 | 1.3 | 2.3 |
| EVALUATION | ABRASION RESISTANCE | A | AA | A | A | B | A |
|  | SOLID IMAGE QUALITY | A | A | A | A | A | A |

|  |  | EXAMPLE 7 | EXAMPLE 8 | EXAMPLE 9 | EXAMPLE 10 | EXAMPLE 11 | EXAMPLE 12 |
|---|---|---|---|---|---|---|---|
| INK SET | TREATMENT LIQUID | TREATMENT LIQUID L | TREATMENT LIQUID M | TREATMENT LIQUID N | TREATMENT LIQUID O | TREATMENT LIQUID P | TREATMENT LIQUID Q |
|  | COLOR INK | INK A | INK A | INK A | INK A | INK A | INK A |
|  | DIFFERENCE IN pH | 1.5 | 1.5 | 1.5 | 1.4 | 1.2 | 1.3 |
| EVALUATION | ABRASION RESISTANCE | A | B | A | A | A | A |
|  | SOLID IMAGE QUALITY | A | A | A | A | A | A |

|  |  | EXAMPLE 13 | EXAMPLE 14 | EXAMPLE 15 | EXAMPLE 16 | COMPARATIVE EXAMPLE 1 | COMPARATIVE EXAMPLE 2 |
|---|---|---|---|---|---|---|---|
| INK SET | TREATMENT LIQUID | LIQUOR R | LIQUID S | LIQUID U | LIQUID A | TREATMENT LIQUID E | TREATMENT LIQUID F |
|  | COLOR INK | INK A | INK A | INK A | INK B | INK A | INK A |
|  | DIFFERENCE IN pH | 2.1 | 1.4 | 0.6 | 2.6 | 1.3 | 1.3 |
| EVALUATION | ABRASION RESISTANCE | B | B | C | A | A | AA |
|  | SOLID IMAGE QUALITY | B | AA | A | B | A | A |

-continued

| | | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 |
|---|---|---|---|---|---|---|
| INK SET | TREATMENT LIQUID | TREATMENT LIQUID H | TREATMENT LIQUID J | TREATMENT LIQUID K | TREATMENT LIQUID T | TREATMENT LIQUID V |
| | COLOR INK | INK A | INK A | INK A | INK A | INK A |
| | DIFFERENCE IN pH | 1.3 | 2.7 | 0.9 | 2.3 | 0.1 |
| EVALU-ATION | ABRASION RESISTANCE | C | B | A | AA | AA |
| | SOLID IMAGE QUALITY | B | A | A | C | C |

3.4. Evaluation Results

The evaluation results are shown in Table 5. In Table 5, the treatment liquid, the color ink, each of which was used in Example, and the difference in pH therebetween are shown. From the table, it was found that in each Example in which the treatment liquid contains a polyvalent metal salt, a resin selected from an acrylic-based resin and a maleic acid-based resin, and a compound selected from an organic acid and an organic amine, the content of the resin with respect to the total mass of the treatment liquid is 1 percent by mass or less, and the treatment liquid has a pH of 5.5 to 7.5, the storage stability of the treatment liquid and the image quality are both preferable.

The present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

From the embodiments and the modified examples described above, the following conclusions can be obtained.

A water-based treatment liquid is used for recording together with an ink jet ink which is a water-based ink composition, and the treatment liquid contains: a polyvalent metal salt; a resin selected from an acrylic-based resin and a maleic acid-based resin; and a compound selected from an organic acid and an organic amine. In the treatment liquid described above, a content of the resin with respect to a total mass of the treatment liquid is 1 percent by mass or less, and the treatment liquid has a pH of 5.5 to 7.5.

According to this treatment liquid, since the resin is contained, even when a lubricant is contained in a member in contact with the treatment liquid, foreign materials are not likely to be generated. In addition, sine the resin is contained at a content of 1 percent by mass or less, the abrasion resistance and the image quality of an image formed by the ink jet ink can be made preferable.

In the treatment liquid described above, the recording may be performed by a recording apparatus, and a member of the recording apparatus in contact with the treatment liquid may contain an aliphatic acid-based lubricant.

According to this treatment liquid, even when a lubricant which is more liable to generate foreign materials is contained in the member, the foreign materials are not likely to be generated, and a foreign material suppressing effect can be made more significant.

The treatment liquid described above may be used for the recording by being ejected from an ink jet head.

According to this treatment liquid, a usage thereof can be reduced.

In the treatment liquid described above, the pH of the treatment liquid may be different from a pH of the ink jet ink by 3 or less.

According to this treatment liquid, the pH of the ink jet ink is suppressed from being excessively increased, and the abrasion resistance and the image quality of the image formed by the ink jet ink may be made more preferable.

In the treatment liquid described above, the resin may also be a water-soluble resin.

According to this treatment liquid, the generation of foreign materials can be further suppressed.

In the treatment liquid described above, a content of the resin with respect to the total mass of the treatment liquid may be 0.05 to 0.6 percent by mass.

According to this treatment liquid, the abrasion resistance of the image formed by the ink jet ink can be further improved.

In the treatment liquid described above, a content of the polyvalent metal salt with respect to the total mass of the treatment liquid may be 0.5 to 10 percent by mass.

According to this treatment liquid, the image quality of the image formed by the ink jet ink can be further improved.

In the treatment liquid described above, a total content of the compound selected from an organic acid and an organic amine with respect to the total mass of the treatment liquid may be 1 percent by mass or less.

According to this treatment liquid, the pH of the treatment liquid is likely to be controlled at 5.5 to 7.5.

In the treatment liquid described above, the treatment liquid may contain the organic acid, and the organic acid may be a dicarboxylic acid.

According to this treatment liquid, the abrasion resistance of the image formed by the ink jet ink can be further improved.

In the treatment liquid described above, the polyvalent metal salt may be an organic acid polyvalent metal salt.

According to this treatment liquid, since an organic acid polyvalent metal salt having a low deliquescence is used, the water resistance and the moisture abrasion resistance of a recorded matter can be further improved.

In the treatment liquid described above, the resin may be a resin not to react with a calcium formate aqueous solution.

According to this treatment liquid, even when a lubricant is contained in the member in contact with the treatment liquid, the generation of foreign materials can be further suppressed.

The treatment liquid described above may further contain a water-soluble low molecular weight compound.

The treatment liquid described above may be used for the recording on a low-absorbing recording medium or a non-absorbing recording medium.

A recording method is a recording method which is performed using the treatment liquid and the ink jet ink described above and which includes a treatment liquid adhesion step of adhering the treatment liquid to a recording medium; and an ink adhesion step of ejecting the ink jet ink from an ink jet head so as to be adhered to the recording medium.

According to this recording method, even when a lubricant is contained in the member in contact with the treatment liquid, foreign materials are not likely to be generated. In addition, the abrasion resistance and the image quality of the image formed by the ink jet ink can be made preferable.

An ink set includes the treatment liquid and the ink jet ink described above.

According to this ink set, even when a lubricant is contained in the member in contact with the treatment liquid, foreign materials are not likely to be generated. In addition, the abrasion resistance and the image quality of the image formed by the ink jet ink can be made preferable.

What is claimed is:

1. A water-based treatment liquid used for recording together with an ink jet ink which is a water-based ink composition, the treatment liquid comprising:
    a polyvalent metal salt;
    a resin selected from an acrylic-based resin and a maleic acid-based resin; and
    a compound selected from an organic acid and an organic amine,
    wherein a content of the resin with respect to a total mass of the treatment liquid is 1 percent by mass or less,
    the treatment liquid has a pH of 5.5 to 7.5, and
    a total content of the compound selected from the organic acid and the organic amine that is resent in the water-based treatment liquid with respect to the total mass of the water-based treatment liquid is 0.2 percent mass or less.

2. The treatment liquid according to claim 1,
    wherein the recording is performed by a recording apparatus, and a member of the recording apparatus in contact with the treatment liquid contains an aliphatic acid-based lubricant.

3. The treatment liquid according to claim 1,
    wherein the treatment liquid is used for the recording by being ejected from an ink jet head.

4. The treatment liquid according to claim 1,
    wherein the pH of the treatment liquid is different from a pH of the ink jet ink by 3 or less.

5. The treatment liquid according to claim 1,
    wherein the resin is a water-soluble resin.

6. The treatment liquid according to claim 1,
    wherein a content of the resin with respect to the total mass of the treatment liquid is 0.05 to 0.6 percent by mass.

7. The treatment liquid according to claim 1,
    wherein a content of the polyvalent metal salt with respect to the total mass of the treatment liquid is 0.5 to 10 percent by mass.

8. The treatment liquid according to claim 1,
    wherein the total content of the compound selected from an organic acid and an organic amine with respect to the total mass of the treatment liquid is 0.001 to 0.2 percent by mass.

9. The treatment liquid according to claim 1,
    wherein the treatment liquid contains the organic acid, and the organic acid is a dicarboxylic acid.

10. The treatment liquid according to claim 1,
    wherein the polyvalent metal salt is an organic acid polyvalent metal salt.

11. The treatment liquid according to claim 1,
    wherein the resin is a resin not to react with a calcium formate aqueous solution.

12. The treatment liquid according to claim 1, further comprising a water-soluble low molecular weight compound.

13. The treatment liquid according to claim 1,
    wherein the treatment liquid is used for the recording on a low-absorbing recording medium or a non-absorbing recording medium.

14. A recording method which uses the treatment liquid and the ink jet ink according to claim 1, the recording method comprising:
    a treatment liquid adhesion step of adhering the treatment liquid to a recording medium; and
    an ink adhesion step of ejecting the ink jet ink from an ink jet head so as to be adhered to the recording medium.

15. An ink set comprising the treatment liquid and the ink jet ink according to claim 1.

16. The treatment liquid according to claim 1, wherein the organic amine is an alkanolamine.

* * * * *